(12) United States Patent
Ju et al.

(10) Patent No.: US 9,979,041 B2
(45) Date of Patent: May 22, 2018

(54) APPARATUS FOR AUTOMATICALLY STACKING FUEL CELL STACK

(71) Applicant: HYUNDAI MOTOR COMPANY, Seoul (KR)

(72) Inventors: HoKyun Ju, Suwon-si (KR); Yoon Jang, Incheon (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 280 days.

(21) Appl. No.: 14/878,972

(22) Filed: Oct. 8, 2015

(65) Prior Publication Data
US 2016/0365598 A1    Dec. 15, 2016

(30) Foreign Application Priority Data

Jun. 9, 2015 (KR) .................. 10-2015-0081508

(51) Int. Cl.
| | |
|---|---|
| *H01M 8/2404* | (2016.01) |
| *B07C 5/342* | (2006.01) |
| *H01M 8/2457* | (2016.01) |
| *H01M 8/2483* | (2016.01) |
| *H01M 8/241* | (2016.01) |
| *H01M 8/2475* | (2016.01) |
| *H01M 8/248* | (2016.01) |

(52) U.S. Cl.
CPC .......... *H01M 8/2404* (2016.02); *B07C 5/342* (2013.01); *H01M 8/241* (2013.01); *H01M 8/248* (2013.01); *H01M 8/2457* (2016.02); *H01M 8/2475* (2013.01); *H01M 8/2483* (2016.02)

(58) Field of Classification Search
CPC .. H01M 8/2404; H01M 8/248; H01M 8/2475; H01M 8/241; H01M 8/2483; H01M 8/2457; B07C 5/342
See application file for complete search history.

(56) References Cited

U.S. PATENT DOCUMENTS

| | | | |
|---|---|---|---|
| 4,132,400 A | 1/1979 | Naramore | |
| 7,615,302 B2 * | 11/2009 | Furukawa | H01M 8/248 33/403 |

(Continued)

FOREIGN PATENT DOCUMENTS

| | | |
|---|---|---|
| JP | 2013-219028 A | 10/2013 |
| KR | 10-2009-0062411 A | 6/2009 |

(Continued)

*Primary Examiner* — Jun Yoo
(74) *Attorney, Agent, or Firm* — McDermott Will & Emery LLP

(57) ABSTRACT

An apparatus for automatically stacking a fuel cell stack includes a component pick-up unit configured to simultaneously pick up one separating plate component accommodated in a first magazine and one membrane-electrode assembly (MEA) sheet component accommodated in a second magazine, and load the components onto a start end of a component transfer route of a conveyor; a component examining unit installed at an upper side of the component transfer route of the conveyor, a defective component extracting unit installed at a rear side of the component examining unit, a component stacking unit installed at a distal end of the component transfer route of the conveyor, and a component pressurizing unit installed at an upper side of a transfer route of the stack guide.

28 Claims, 25 Drawing Sheets

(56) References Cited

U.S. PATENT DOCUMENTS

| | | | | |
|---|---|---|---|---|
| 7,981,572 B2* | 7/2011 | Fujiki | ................. | H01M 8/0271 |
| | | | | 429/400 |
| 9,017,901 B2* | 4/2015 | Tanahashi | ........... | H01M 8/0273 |
| | | | | 429/535 |
| 9,203,103 B2* | 12/2015 | Hayashi | .............. | H01M 8/0273 |
| 2010/0108236 A1* | 5/2010 | Berggren | ................ | H01M 8/00 |
| | | | | 156/64 |

FOREIGN PATENT DOCUMENTS

| KR | 10-2014-0009015 A | 1/2014 |
|---|---|---|
| KR | 10-2015-0035271 A | 4/2015 |

\* cited by examiner (a)

(b)

310

350

350

410

450

APPARATUS FOR AUTOMATICALLY STACKING FUEL CELL STACK

CROSS-REFERENCE TO RELATED APPLICATION

This application claims the benefit of priority to Korean Patent Application No. 10-2015-0081508, filed in the Korean Intellectual Property Office on Jun. 9, 2015, the entire contents of which are herein incorporated by reference.

TECHNICAL FIELD

The present disclosure relates to an automatic fuel cell stack assembling system, and more particularly, to an apparatus for automatically stacking a fuel cell stack that automatically stacks fuel cell components.

BACKGROUND

A fuel cell stack is a power generating device which generates electric energy through an electrochemical reaction between hydrogen and oxygen in fuel cells, and may be employed in a fuel cell vehicle.

The fuel cell stack is formed by an electricity generating assembly, in which fuel cells (unit cells) are arranged. The fuel cell has a configuration in which separating plates are disposed at both sides of a membrane electrode assembly (MEA), with the MEA interposed therebetween. The fuel cells may be fastened through an end plate and a fastening means in a pressurized state.

The aforementioned fuel cell stack may be manufactured by a process of stacking fuel cells one by one, pressurizing the stacked fuel cells with a press while the fuel cells are disposed between upper and lower end plates, and fastening the end plate through the fastening means.

In the related art, a fuel cell stack is manufactured by manually and collectively stacking fuel cells through a predetermined guide mechanism, or dividing and stacking the fuel cells in a unit of a small module and manually stacking the fuel cells in the unit of the small module.

Accordingly, according to the related art, a general cycle time including stacking, pressurizing, and fastening of the fuel cells may be disadvantageous, and reliability in a given stack level of the fuel cells may be decreased.

In addition, in order to manufacture a fuel cell stack, a supply and an examination of respective components configuring the fuel cells, a stack method satisfying handling and securing a stack degree for the components, and an air-tightness maintenance and stack fastening process by pressurizing the fuel cells is also included.

However, in the related art, the aforementioned processes are manually performed and productivity may decrease due to an increase in a required time for assembling the fuel cell stack, and a quality of the fuel cell stack may decrease because a stack degree of the fuel cells cannot be guaranteed.

The above information disclosed in this Background section is only for enhancement of understanding of the background of the disclosure and therefore it may contain information that does not form the prior art that is already known in this country to a person of ordinary skill in the art.

SUMMARY OF THE DISCLOSURE

The present disclosure has been made in an effort to provide an apparatus for automatically stacking a fuel cell stack, which is capable of automatically stacking and pressurizing fuel cell components and assembling the fuel cell stack.

An exemplary embodiment of the present disclosure provides an apparatus for automatically stacking a fuel cell stack, including: a component pick-up unit configured to simultaneously pick up one separating plate component accommodated in a first magazine and one membrane-electrode assembly (MEA) sheet component accommodated in a second magazine, and load the components onto a start end of a component transfer route of a conveyor; a component examining unit installed at an upper side of the component transfer route of the conveyor and configured to examine the separating plate component and the MEA sheet component transferred along the conveyor; a defective component extracting unit installed at a rear side of the component examining unit, and configured to grip each of the separating plate component and the MEA sheet component as a unit set determined to have a defect by the component examining unit, and load the gripped components onto a tray of an external side of the conveyor; a component stacking unit installed at a distal end of the component transfer route of the conveyor, and configured to grip the separating plate component and the MEA sheet component, and stack the components on a stack guide provided to be transferred in a direction crossing the component transfer route of the conveyor; and a component pressurizing unit installed at an upper side of a transfer route of the stack guide, and configured to pressurize the separating plate component and the MEA sheet component which are sequentially stacked on the stack guide.

The first magazine may accommodate a plurality of sheets of separating plate components, in which negative electrode metal separating plates are bonded to positive electrode metal separating plates.

The second magazine may accommodate a plurality of sheets of the MEA sheet components, in which gas diffusion layers (GDL) are bonded to both surfaces of an MEA.

The apparatus may further include a lift unit configured to support at least a pair of first and second magazines, and lift the components accommodated in the first and second magazines by driving a motor.

The component pick-up unit may include: a pair of first and second gripper brackets installed so as to reciprocate along the component transfer route of the conveyor, and installed so as to reciprocate in a vertical direction; a first component gripper installed at the first gripper bracket, and configured to vacuum-adsorb the separating plate component accommodated in the first magazine and load the vacuum-adsorbed separating plate component onto the start end of the component transfer route of the conveyor; and a second component gripper installed at the second gripper bracket, and configured to vacuum-adsorb the MEA sheet component accommodated in the second magazine and load the vacuum-adsorbed MEA sheet component onto the start end of the component transfer route of the conveyor.

The component pick-up unit may further include a paper gripper installed at the first gripper bracket, and configured to vacuum-adsorb paper interposed between the separating plate components in the first magazine through a manifold hole of the separating plate components.

The component pick-up unit may further include a paper separating member installed at the first gripper bracket, and configured to separate a paper through the manifold hole of the separating plate component in a state where vacuum of the paper gripper is released.

A paper collecting container for collecting the paper separated from the separating plate component by the paper separating member may be installed at the start end of the component transfer route of the conveyor.

The component examining unit may include a pair of location sensing visions configured to detect edge locations of manifold holes provided at both sides of the separating plate component and the MEA sheet component and output the detection signals to a controller.

The defective component extracting unit may include a plurality of defective component extracting grippers installed so as to reciprocate in a direction crossing the component transfer route of the conveyor and installed so as to reciprocate in a vertical direction, and configured to vacuum-adsorb the separating plate component and the MEA sheet component.

The component stacking unit may include a pair of stack grippers disposed at an upper side of a start end of a transfer route of the stack guide, installed so as to reciprocate in a transfer direction of the separating plate component and the MEA sheet component and installed so as to reciprocate in a vertical direction, and configured to vacuum-adsorb the separating plate component and the MEA sheet component.

The component pressurizing unit may include a press member installed so as to reciprocate in a vertical direction by a press cylinder, and provided to be rotatable by a motor.

A pair of fixing rods for fixing a stack body, in which the separating plate component and the MEA sheet component are stacked, separately from the stack guide, may be installed in the press member.

The apparatus may further include an air-tightness examining unit installed to be connected to the component pressurizing unit, and configured to supply a fluid to a stack body, in which the separating plate component and the MEA sheet component are stacked by the component pressurizing unit, and examine air-tightness of the stack body.

The apparatus may further include: a stack examining unit installed at the component stacking unit side, and configured to examine the separating plate component and the MEA sheet component stacked on the stack guide; and an end plate loading unit installed at an external side of a transfer route of the stack guide, and configured to grip each of upper and lower end plates and load the gripped end plates onto the stack guide.

Another exemplary embodiment of the present disclosure provides an apparatus for automatically stacking a fuel cell stack, including: a component pick-up unit configured to simultaneously pick up one separating plate component and one membrane-electrode assembly (MEA) sheet component accommodated in magazines, respectively, and load the components onto a start end of a component transfer route of a conveyor; a component aligning unit installed to be connected to a distal end of the component transfer route of the conveyor, and configured to align the separating plate component and the MEA sheet component transferred through the conveyor at predetermined locations; a component stacking unit installed at the component aligning unit, and configured to grip the separating plate component and the MEA sheet component and stack the components on a stack guide provided to be transferred a direction crossing the component transfer route of the conveyor; and a component pressurizing unit installed at an upper side of a transfer route of the stack guide, and configured to pressurize the separating plate component and the MEA sheet component which are sequentially stacked on the stack guide.

The component stacking unit may include a pair of stack grippers disposed at an upper side of a start end of a transfer route of the stack guide, installed so as to reciprocate in a transfer direction of the separating plate component and the MEA sheet component and installed so as to reciprocate in a vertical direction, and configured to vacuum-adsorb the separating plate component and the MEA sheet component.

The pair of stack grippers may vacuum-adsorb any one component between the separating plate component and the MEA sheet component located at a finish end of the conveyor and load the vacuum-adsorbed component onto the component aligning unit.

The pair of stack grippers may vacuum-adsorb the other component located in the component aligning unit and load the vacuum-adsorbed component onto the stack guide.

The component aligning unit may include: a single base plate configured to support the separating plate component and the MEA sheet component; and touch members installed on the base plate, and configured to touch edge portions of the separating plate component and the MEA sheet component.

The base plate may be provided with a plurality of air exhaust holes which discharges air and raises the separating plate component and the MEA sheet component with pressure of the air.

The touch members may include: a pair of first touch members fixedly installed at a rear external side of the base plate, fitted to a rear edge portion of the base plate, and configured to touch rear edge portions of the separating plate component and the MEA sheet component; a pair of second touch members installed to be movable in front and rear directions at a front external side of the base plate, fitted to a front edge portion of the base plate, and configured to touch front edge portions of the separating plate component and the MEA sheet component; and a pair of third touch members installed to be movable in a side direction at both sides of the base plate, and configured to touch both side edge portions of the separating plate component and the MEA sheet component while passing through both sides of the base plate.

The second touch member may be installed to reciprocate in the front and rear directions by a first touch cylinder fixedly provided to a lower surface of the base plate.

The third touch member may be installed to reciprocate in a side direction by a second touch cylinder fixedly provided to the lower surface of the base plate.

Still another exemplary embodiment of the present disclosure provides an apparatus for automatically stacking a fuel cell stack, including: a component pick-up unit configured to simultaneously pick up one separating plate component and one membrane-electrode assembly (MEA) sheet component accommodated in magazines, respectively, and load the components onto a start end of a component transfer route of a conveyor; a component stacking unit installed at a distal end of the component transfer route of the conveyor, and configured to grip the separating plate component and the MEA sheet component, and stack the components on a stacking guide provided to be transferred in a direction crossing the component transfer route of the conveyor; a component pressurizing unit installed at an upper side of a transfer route of the stack guide, and configured to pressurize the separating plate component and the MEA sheet component which are sequentially stacked on the stack guide; an end plate loading unit installed at an external side of a transfer route of the stack guide between the component stacking unit and the component pressurizing unit, and configured to grip each of upper and lower end plates and load the gripped end plate onto the stack guide; and a transferring unit configured to transfer the stack guide, on which the separating plate component and the MEA sheet component are stacked by the component stacking unit from a start end of the transfer route of the stack guide to the component pressurizing unit side, and transfer a stack body, in which the separating plate component and the MEA sheet component are stacked by the component pressurizing unit, from the component pressurizing unit side to a finish end of the transfer route of the stack guide, separately from the stack guide.

The apparatus may further include a stack discharging unit installed to be movable to the finish end of the transfer route of the stack guide from the component pressurizing unit side, and discharge the stack body to an external side of the transfer route of the stack guide.

The transferring unit may include: a first transfer rail configured to connect a start end and a finish end of the transfer route of the stack guide in a direction crossing a component transfer route of the conveyor; a second transfer rail connected with the first transfer rail while crossing the first transfer rail in a direction far from the end plate loading unit between the component stacking unit and the component pressurizing unit; and a pair of first transfer stages provided so as to correspond to the component stacking unit and the component pressurizing unit, respectively, and installed to be movable along the first and second transfer rails while supporting the stack guide between the component stacking unit and the component pressurizing unit.

The component pressurizing unit may separate the stack body from the stack guide and load the stack body onto the stack discharging unit.

The end plate loading unit may load a lower end plate onto the stack guide in an unloaded state, from which the stack body is separated, on the first transfer rail between the component stacking unit and the component pressurizing unit, and load an upper end plate onto the stack guide, on which the separating plate component and the MEA sheet component are stacked by the component stacking unit.

The second transfer rail may be provided as an evasion section for evading the stack guide, onto which the lower end plate is loaded, from the first transfer rail through the first transfer stage.

The stack discharging unit may include: a second transfer stage installed to be movable between a start end and a finish end of the first transfer rail along a section from the component pressurizing unit side to the finish end of the first transfer rail; and a tilting discharging unit installed in the second transfer stage, and configured to tilt and discharge the stack body to an external side of the first transfer rail.

The tilting discharging unit may include: a tilt bracket configured to support the stack body, and installed to be rotatable in the second transfer stage; and a tilt operating cylinder installed to be connected to the tilt bracket, and operating forward and backward in a vertical direction.

BRIEF DESCRIPTION OF THE DRAWINGS

The drawings are for reference in describing an exemplary embodiment of the present disclosure, so that it shall not be construed that the technical spirit of the present disclosure is limited to the accompanying drawings.

DETAILED DESCRIPTION

Figure 1:
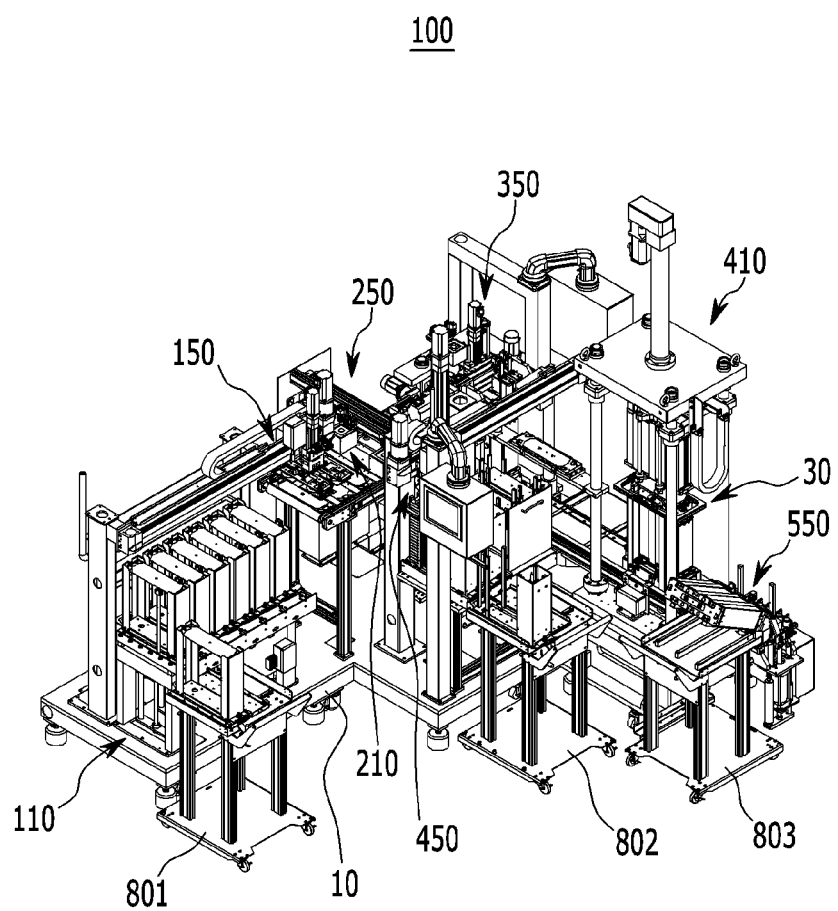
FIGS. 1 to 4 are perspective views illustrating an apparatus for automatically stacking a fuel cell stack according to an exemplary embodiment of the present disclosure.
Figure 2:
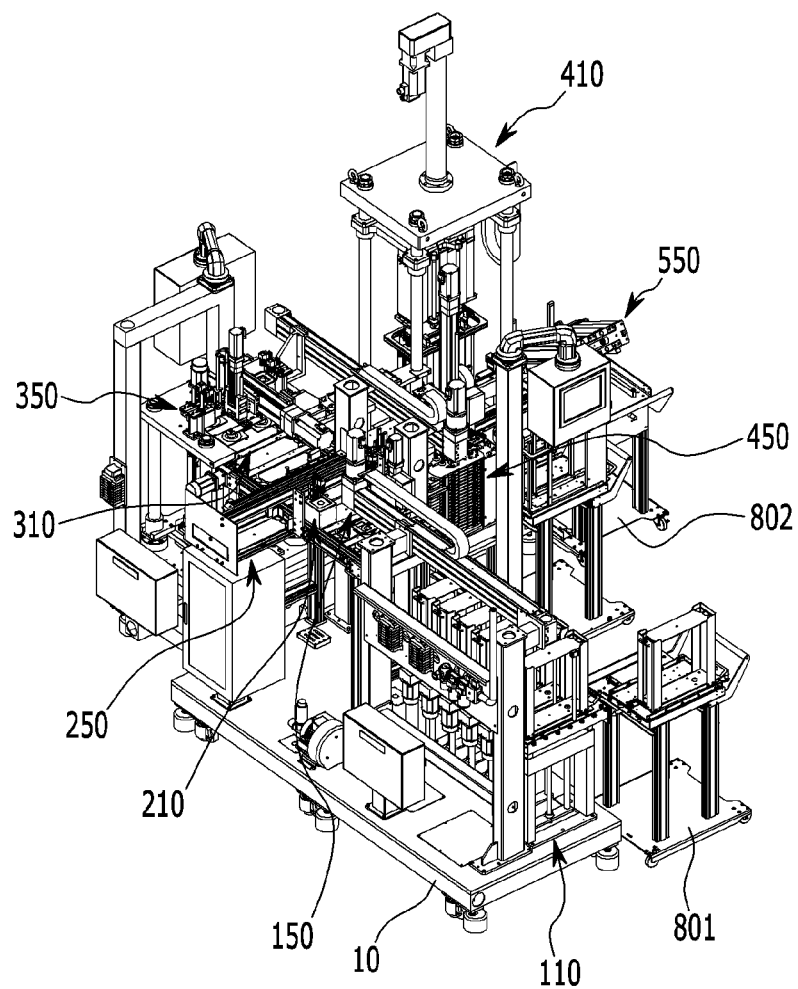
Figure 3:
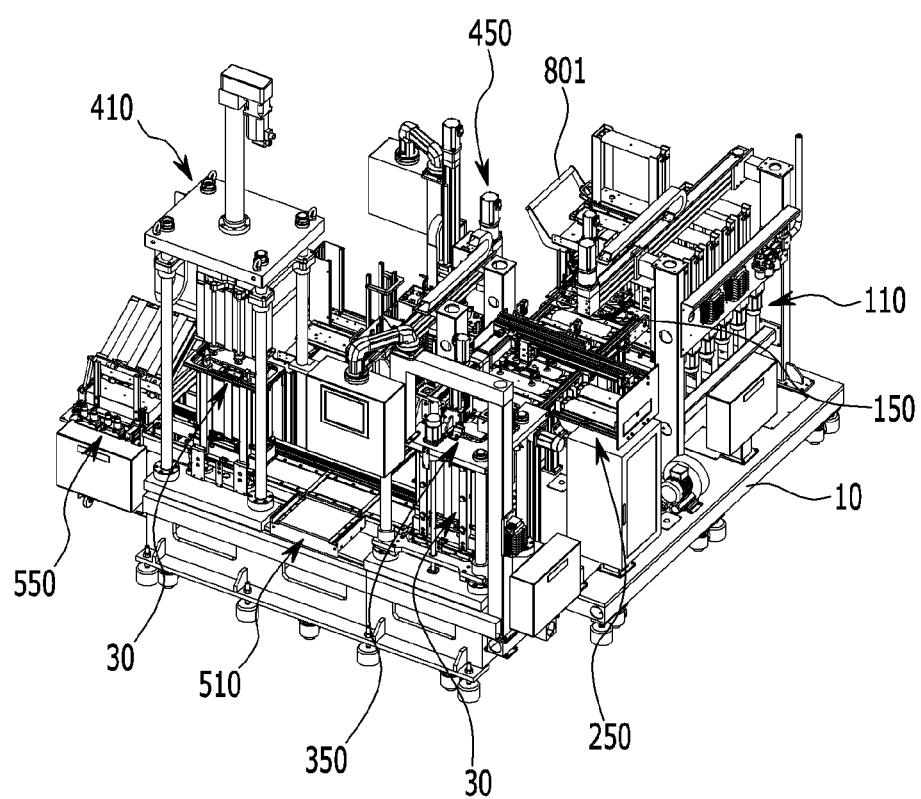
Figure 4:
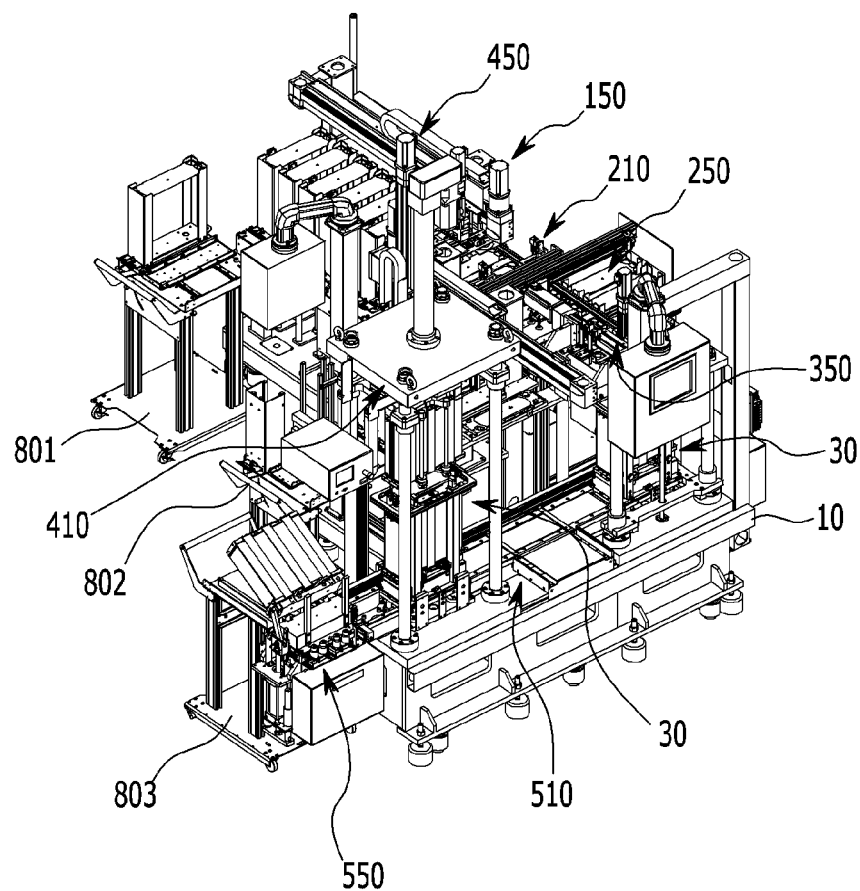

The present disclosure will be described more fully hereinafter with reference to the accompanying drawings, in which exemplary embodiments of the disclosure are shown. As those skilled in the art would realize, the described embodiments may be modified in various different ways, all without departing from the spirit or scope of the present disclosure.

In describing the present disclosure, parts that are not related to the description will be omitted. Like reference numerals generally designate like elements throughout the specification.

In addition, the size and thickness of each configuration shown in the drawings are arbitrarily shown for understanding and ease of description, but the present disclosure is not limited thereto, and the thickness of layers, films, panels, regions, etc., are exaggerated for clarity.

Further, in the following detailed description, names of constituents, which are in the same relationship, are divided into "the first", "the second", and the like, but the present disclosure is not limited to the order in the following description.

Throughout the specification, unless explicitly described to the contrary, the word "comprise" and variations such as "comprises" or "comprising", will be understood to imply the inclusion of stated elements but not the exclusion of any other elements.

In addition, a term, such as "unit", "means", "part", and "member", which is described in the specification, means a unit of a comprehensive configuration that performs at least one function or operation.

Figure 5:
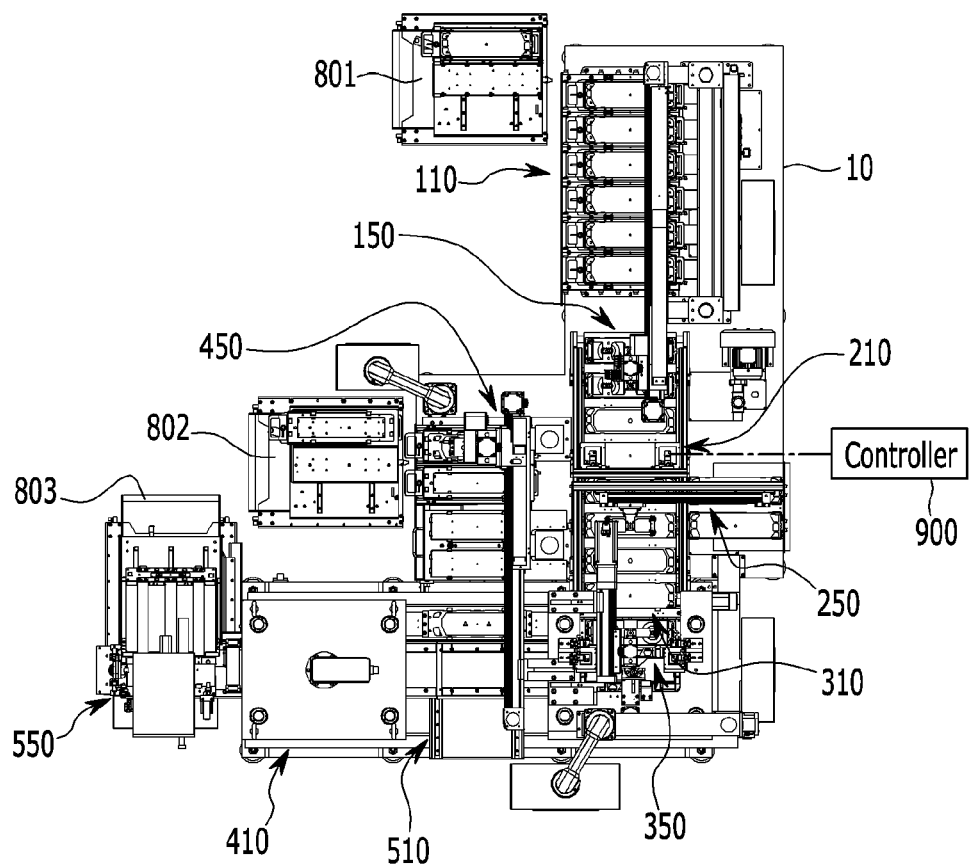
FIGS. 5 to 7 are a top plan view, a rear view, and a side view, respectively, of the apparatus for automatically stacking a fuel cell stack according to the exemplary embodiment of the present disclosure.
Figure 6:
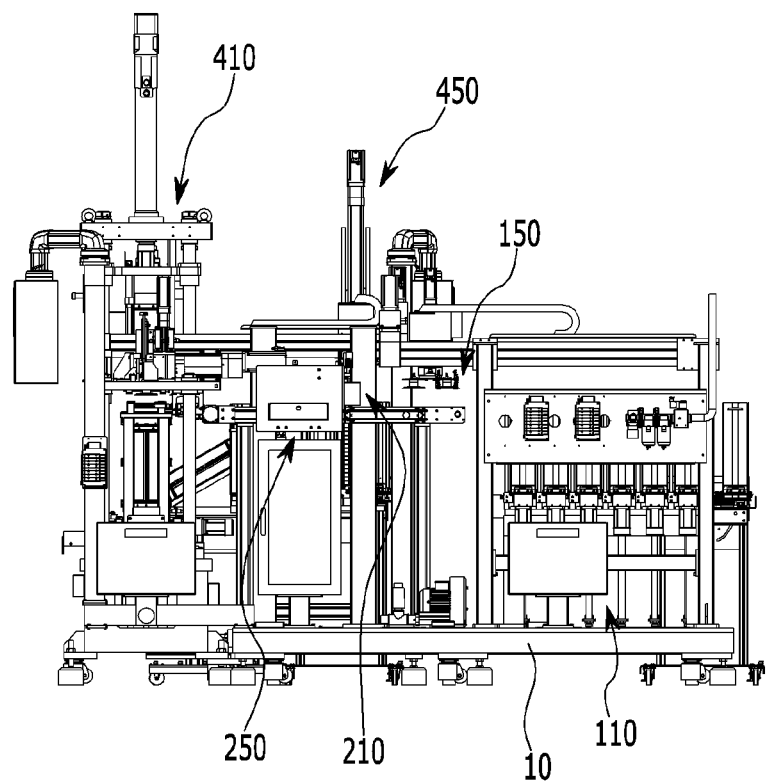
Figure 7:
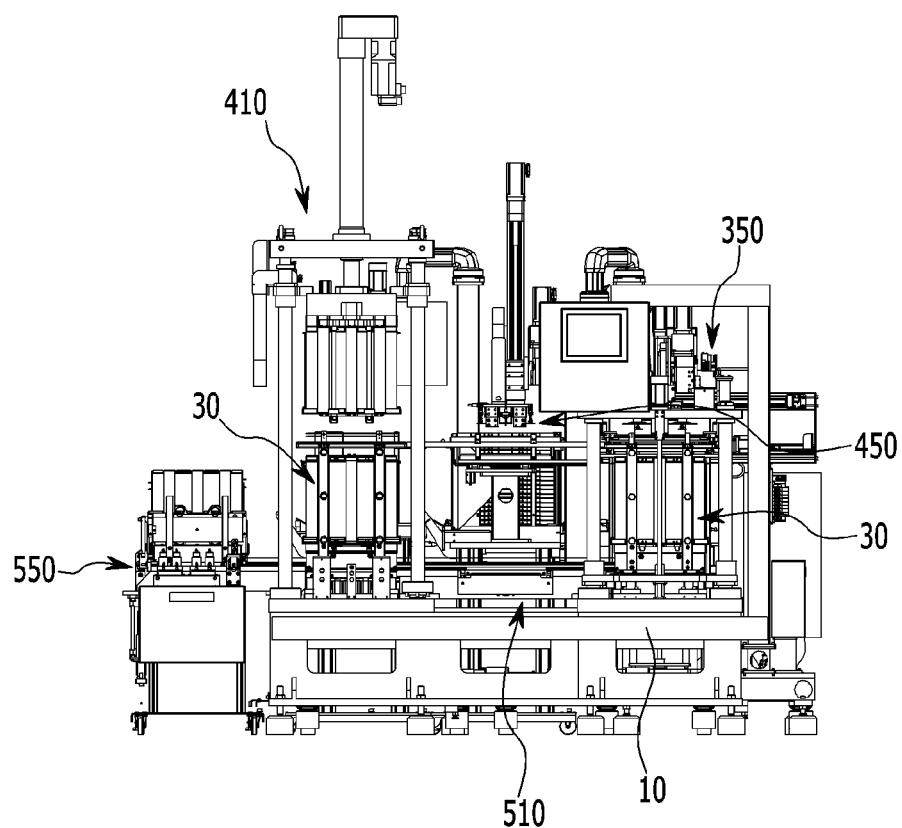

FIGS. 1 to 4 are perspective views illustrating an apparatus for automatically stacking a fuel cell stack according to an exemplary embodiment of the present disclosure, and FIGS. 5 to 7 are a top plan view, a rear view, and a side view, respectively, of the apparatus for automatically stacking a fuel cell stack according to the exemplary embodiment of the present disclosure.

Referring to FIGS. 1 to 7, an apparatus 100 for automatically stacking a fuel cell stack according to an exemplary embodiment of the present disclosure may assemble a fuel cell stack 1 (hereinafter, see FIG. 8) by a process of sequentially stacking a plurality of sheets of fuel cells, pressurizing the stacked fuel cells, and fastening the fuel cells together with upper and lower end plates.

Figure 8:
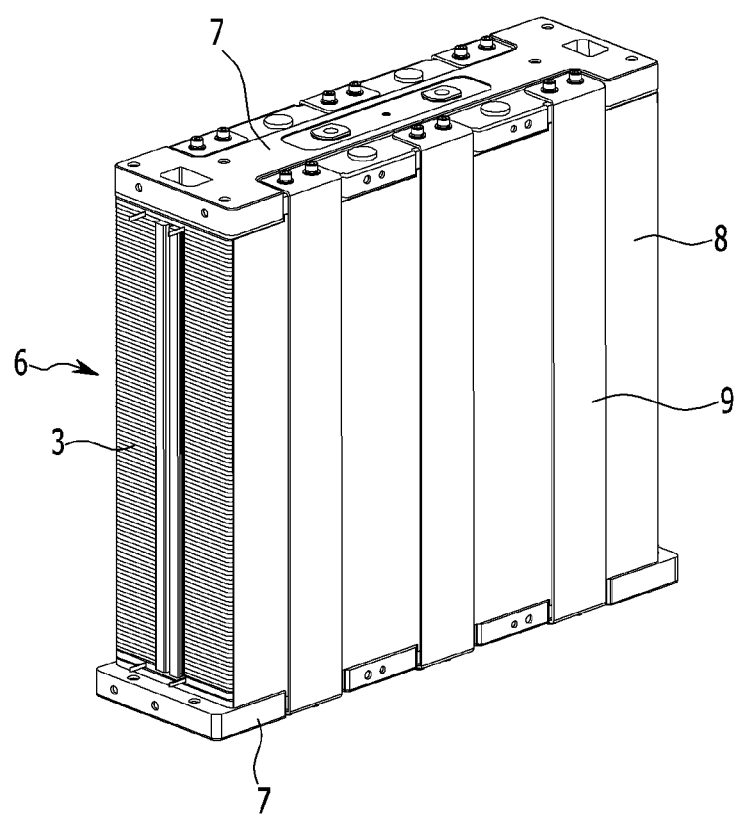
FIG. 8 is a diagram schematically illustrating a fuel cell stack applied to the apparatus for automatically stacking a fuel cell stack according to the exemplary embodiment of the present disclosure.

For example, the fuel cell stack 1 assembled by the apparatus 100 for automatically stacking a fuel cell stack may include continuously stacked fuel cell components 3, end plates 7 disposed at upper and lower sides of the fuel cell components 3, and a fastening bar 9 fastening the upper and lower end plates with the fuel cell components 3 interposed between the end plates 7 as illustrated in FIG. 8.

Figure 9:
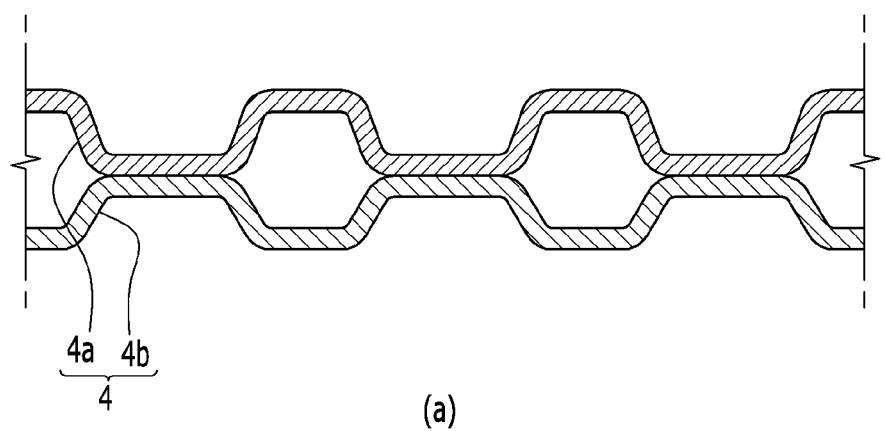
FIG. 9 is a diagram schematically illustrating a fuel cell component of the fuel cell stack applied to the apparatus for automatically stacking a fuel cell stack according to the exemplary embodiment of the present disclosure.
Figure 9:
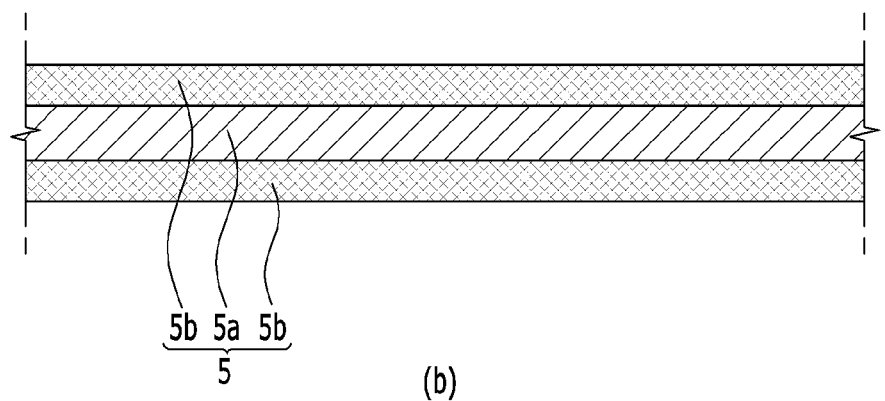

As illustrated in FIG. 9, the fuel cell components 3 include a separating plate component 4, in which a negative electrode metal separating plate 4a and a positive electrode metal separating plate 4b are bonded to each other, and a membrane-electrode assembly (MEA) sheet component 5, in which gas diffusion layers (GDL) 5b are bonded to both surfaces of an MEA 5a, respectively.

The fuel cell components 3 may be formed into a stack body 6 of the fuel cell stack 1 in which the plurality of sheets of the separating plate components 4 and the MEA sheet component 5 are sequentially and continuously stacked. Reference numeral 8, which is not described in FIG. 8, denotes an insulating plate disposed on a lateral surface of the stack body 6.

Hereinafter, constituent elements of the apparatus 100 for automatically stacking a fuel cell stack according to the exemplary embodiment of the present disclosure will be described based on the fact that the separating plate component 4 and the MEA sheet component 5 are vertically stacked. Accordingly, a part heading an upper side of the constituent element may be defined as an upper end part, an upper part, and an upper surface, and a part heading a lower side of the constituent element may be defined as a lower end part, a lower part, and a lower surface.

The apparatus 100 for automatically stacking a fuel cell stack according to the exemplary embodiment of the present disclosure has a structure capable of decreasing an operation time for assembling the fuel cell stack 1 to improve productivity, and guaranteeing a stack degree of the fuel cell components 3 by automatically stacking and pressurizing the fuel cell components 3.

To this end, the apparatus 100 for automatically stacking a fuel cell stack according to the exemplary embodiment of the present disclosure may include a lift unit 110, a component pick-up unit 150, a component examining unit 210, a defective component extracting unit 250, a component aligning unit 310, a component stacking unit 350, a component pressurizing unit 410, an end plate loading unit 450, a transferring unit 510 and a stack discharging unit 550.

The various constituent elements are formed on a frame 10, and the frame 10 supports the constituent elements and may be formed of one frame or two or more divided frames.

The frame 10 may include various accessory elements, such as various brackets, bars, rods, plates, housings, cases, blocks, partition walls, ribs, rails, collars, and height adjusting means, for supporting the constituent elements.

However, the various accessory elements are provided for installing respective constituent elements, which are to be described below, in the frame 10. Accordingly, in the exemplary embodiment of the present disclosure, the accessory elements are collectively named the frame 10 except for an exceptional case.

Figure 10:
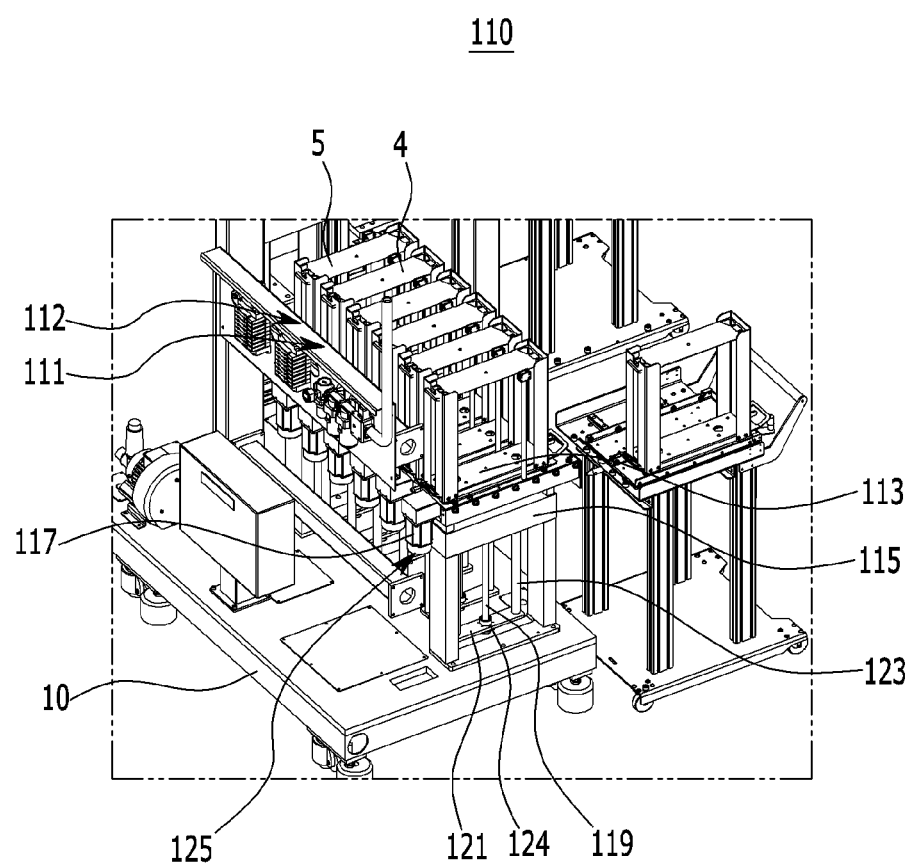
FIG. 10 is a diagram illustrating a lift unit applied to the apparatus for automatically stacking a fuel cell stack according to the exemplary embodiment of the present disclosure.

In the exemplary embodiment of the present disclosure, the lift unit 110 supports a first magazine 111, in which the separating plate components 4 are accommodated, and a second magazine 112, in which the MEA sheet components 5 are accommodated, and performs a function for lifting the components when the components are unloaded (see FIG. 10).

Here, the first and second magazines 111 and 112 accommodate the separating plate components 4 and the MEA sheet components 5, which are vertically stacked, respectively, and have a form in which upper and lower ends and front and rear surfaces are opened as illustrated in FIG. 10. Lift plates 113 are installed at the lower opened ends of the first and second magazines 111 and 112 so as to be vertically movable.

The lift plates 113 may support the separating plate components 4 and the MEA sheet components 5 in the first and second magazines 111 and 112, and lift the components when the components are unloaded.

The lift unit 110 may include a lift support frame 115 installed in the frame 10, and a lift driving means 125 installed in the lift support frame 115.

The lift support frame 115 may support the first and second magazines 111 and 112. In addition to the pair of first and second magazines 111 and 112, another and still another pair of first and second magazines 111 and 112 may be disposed on the lift support frame 115. Here, another and still another pair of first and second magazines 111 and 112 are buffer magazines for inserting a new magazine according to an automation process.

The lift driving means 125 vertically moves the lift plate 113 of the first and second magazines 111 and 112. The lift driving means 125 includes a lift motor 117 installed so as to be fixed to the lift support frame 115, a lead screw 119 rotating while being connected to the lift motor 117, a lifting plate 121 screw-engaged with the lead screw 119, and a pair of guide bars 123 coupled with the lifting plate 121 and connected with the lift plate 113.

The lead screw 119 is vertically disposed, so that an upper end of the lead screw 119 is rotatably connected to the support frame 115, and a lower end of the lead screw 119 is rotatably connected to the frame 10. The lead screw 119 may be connected with the lift motor 117 through a belt and a belt pulley (not illustrated), and be rotated in forward and backward directions by driving the lift motor 117.

The lifting plate 121 may be screw-engaged with the lead screw 119 through the nut 124, and the lead screw 119 is rotated in forward and backward directions by the driving of the lift motor 117, so that the lifting plate 121 may be guided by the guide bar 123 to be movable in the vertical direction.

Further, the guide bars 123 are coupled to both sides of the lifting plate 121, and vertically disposed in parallel to the lead screw 119. A lower end of the guide bar 123 is connected with the lifting plate 121, and the upper end thereof is connected with the lift plate 113.

Accordingly, in the exemplary embodiment of the present disclosure, the lead screw 119 is rotated in the forward and backward directions by the lift motor 117, and the lifting plate 121 moves vertically, thereby moving the lift plates 113 of the first and second magazines 111 and 112 in the vertical direction.

In the exemplary embodiment of the present disclosure, the component pick-up unit 150 simultaneously picks up (grips or unloads) one of the separating plate components 4 accommodated in the first magazine 111 and one of the MEA sheet components 5 accommodated in the second magazine 112, and loads the components 4 and 5 onto a start end of a component transfer route 131 of a conveyor 130.

Here, the conveyor 130 transfers the separating plate components 4 and the MEA sheet components 5 and is installed in the frame 10. For example, the conveyor 130 may include a conveyor belt travelling in a caterpillar phase through a conveyor roller. Since the conveyor 130 is formed of a conveyor device that is a known technology, a more detailed description of a configuration thereof will be omitted in the present specification.

Further, the conveyor 130 forms the component transfer route 131 connected from the lift unit 110 to a component stacking unit 350, which will be described in more detail below, in an arrangement direction of the first and second magazines 111 and 112.

Hereinafter, the lift unit 110 side in the component transfer route 131 is referred to as a start end, the component stacking unit 350 side is referred to as a finish end, the start end is referred to as a front side, and the finish end is referred to as a rear side.

Figure 11:
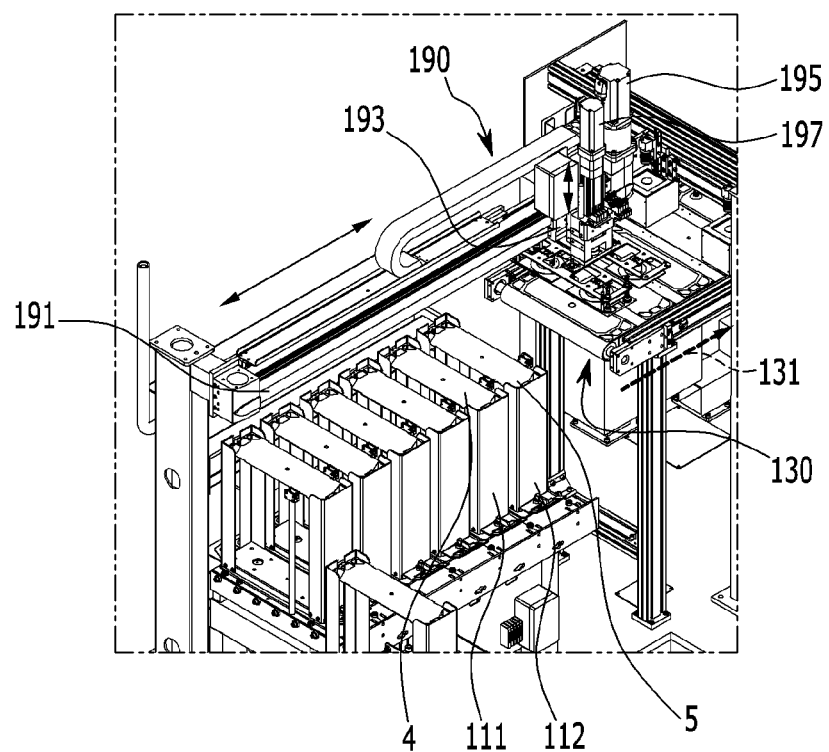
FIGS. 11 and 12 are diagrams illustrating a component pick-up unit applied to the apparatus for automatically stacking a fuel cell stack according to the exemplary embodiment of the present disclosure.
Figure 12:
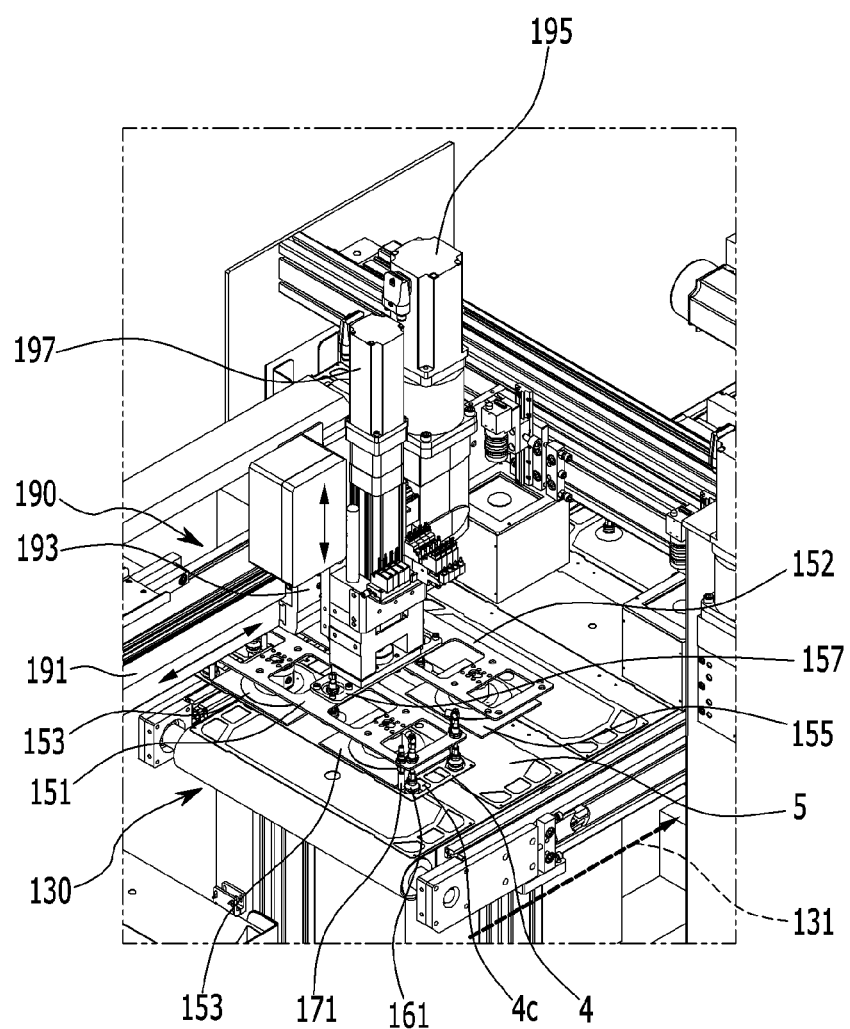

The component pick-up unit 50 includes a pair of first and second gripper brackets 151 and 152, a first component gripper 153 installed in the first gripper bracket 151, and a second component gripper 155 installed in the second gripper bracket 152 as illustrated in FIGS. 11 and 12.

The first and second gripper brackets 151 and 152 are integrally connected through a connecting bracket 157, and installed to reciprocate in the same direction as that of the component transfer route 131 of the conveyor 130 and to reciprocate in the vertical direction by a first driving means 190.

The first driving means 190 includes a first guide rail 191 disposed in the same direction as that of the component transfer route 131 of the conveyor 130, a first slider 193 slidably coupled to the first guide rail 191, a first driving motor 195 providing driving force to the first slider 193, and a first driving cylinder 197 coupled to the first slider 193 and connected with the connecting bracket 157.

Accordingly, the first and second gripper brackets 151 and 152 may reciprocate in the same direction as that of the component transfer route 131 of the conveyor 130 according to a straight movement of the first slider 193 along the first guide rail 191 by the driving of the first driving motor 195. Further, the first and second gripper brackets 151 and 152 may vertically reciprocate by the driving of the first driving cylinder 197.

The first component gripper 153 is installed so as to be fixed to a first gripper bracket 151. The first component gripper 153 provides a vacuum cup applying a vacuum suction force, and adsorbs the separating plate components 4 accommodated in the first magazine 111 with the vacuum suction force.

The second component gripper 155 is installed to be fixed to a second gripper bracket 152. The second component gripper 155 provides a vacuum cup applying a vacuum suction force, and adsorbs the MEA sheet components 5 accommodated in the second magazine 112 with the vacuum suction force.

The first and second component grippers 153 and 155 move toward the first and second magazines 111 and 112 and move in the down direction by the first driving means 190, and vacuum-adsorb the separating plate components 4 and the MEA sheet components 5 accommodated in the first and second magazines 111 and 112, respectively.

Further, the first and second component grippers 153 and 155 move in the up direction by the first driving means 190 in a state of vacuum-adsorbing the separating plate components 4 and the MEA sheet components 5, respectively, and move toward the start end of the conveyor 130.

Further, when the vacuum suction force is released in the state where the first and second component grippers 153 and 155 move in the down direction by the first driving means 190, the first and second component grippers 153 and 155 load the separating plate component 4 and the MEA sheet component 5 to the start end of the component transfer route 131 of the conveyor 130, respectively.

In the meantime, the component pick-up unit 150 according to the exemplary embodiment of the present disclosure further includes paper grippers 161 and paper separating members 171.

When the separating plate component 4 within the first magazine 111 is vacuum-adsorbed through the first component gripper 153, the paper gripper 161 simultaneously vacuum-adsorbs a paper 169 (hereinafter, see FIG. 13) interposed between the separating plate components 4.

The paper gripper 161 is fixedly installed in the first gripper bracket 151, and provides a vacuum cup applying a vacuum suction force. The paper grippers 161 are installed at corners of the first gripper bracket 151, and vacuum-adsorb the paper 169 through a manifold hole 4c of the separating plate component 4.

The paper separating member 171 separates the paper 169 from the separating plate component 4 and the paper gripper 161 in a state where the vacuum suction force of the paper gripper 161 is released. The paper separating member 171 is fixedly installed in the first gripper bracket 151, and is provided as an operating rod moving forward and backward in the vertical direction by the operating cylinder.

The paper separating members 171 are installed at respective corners of the first gripper bracket 151, and operate forward and backward through the manifold hole 4c of the separating plate component 4, and separate the paper 169 from the separating plate component 4 and the paper gripper 161.

The paper 169 may be separated from the separating plate component 4 and the paper gripper 161 through the paper separating member 171 during a process in which the paper 169 moves toward the start end of the component transfer route 131 of the conveyor 130 in a state of being vacuum-adsorbed to the paper gripper 161 together with the separating plate component 4 vacuum-adsorbed to the first component gripper 153.

Figure 13:
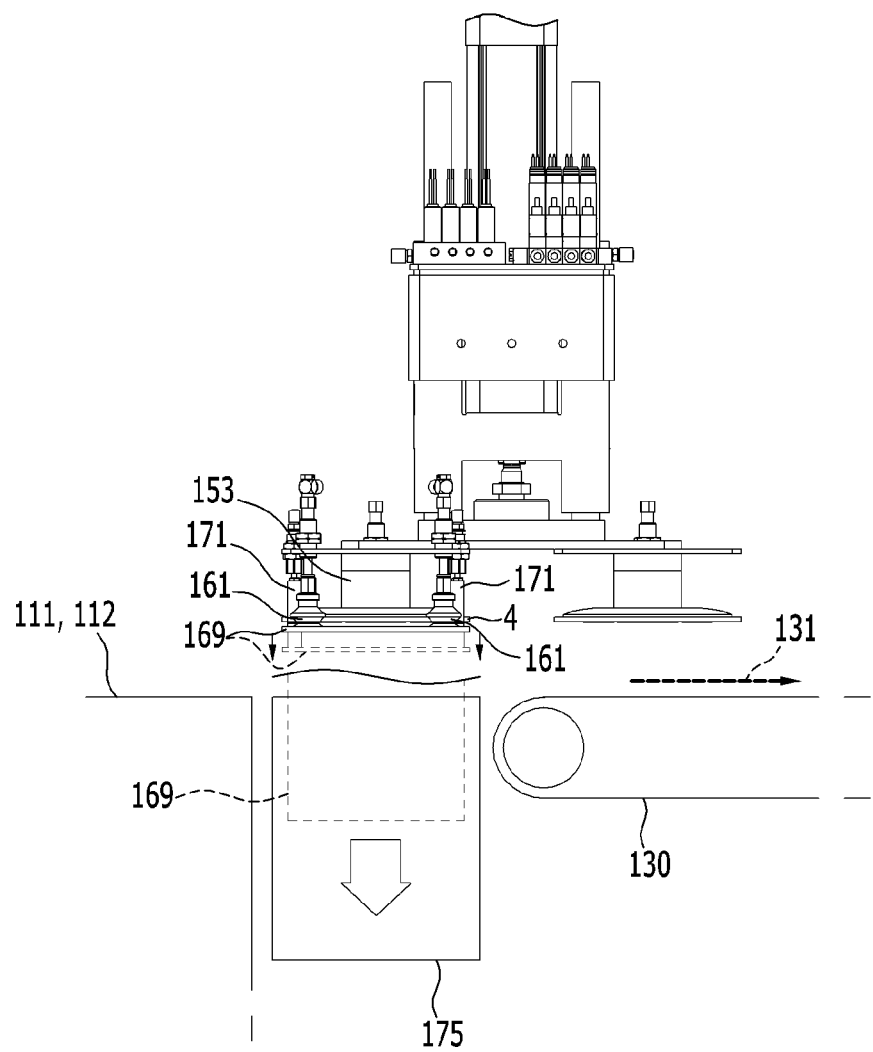
FIG. 13 is a diagram illustrating a paper collecting structure of the component pick-up unit applied to the apparatus for automatically stacking a fuel cell stack according to the exemplary embodiment of the present disclosure.

The paper 169 separated from the separating plate component 4 and the paper gripper 161 may freely fall, and be collected to a paper collecting container 175 installed between the first and second magazines 111 and 112 and the start end of the component transfer route 131 of the conveyor 130 as illustrated in FIG. 13. As described above, the paper 169 collected to the paper collecting container 175 may be recycled.

In the exemplary embodiment of the present disclosure, the component examining unit 210 examines the separating plate component 4 and the MEA sheet component 5 transferred along the component transfer route 131 of the conveyor 130. That is, the component examining unit 210 detects edge locations of the separating plate component 4 and the MEA sheet components 5 and examines whether the separating plate component 4 and the MEA sheet components 5 are defective.

Figure 14:
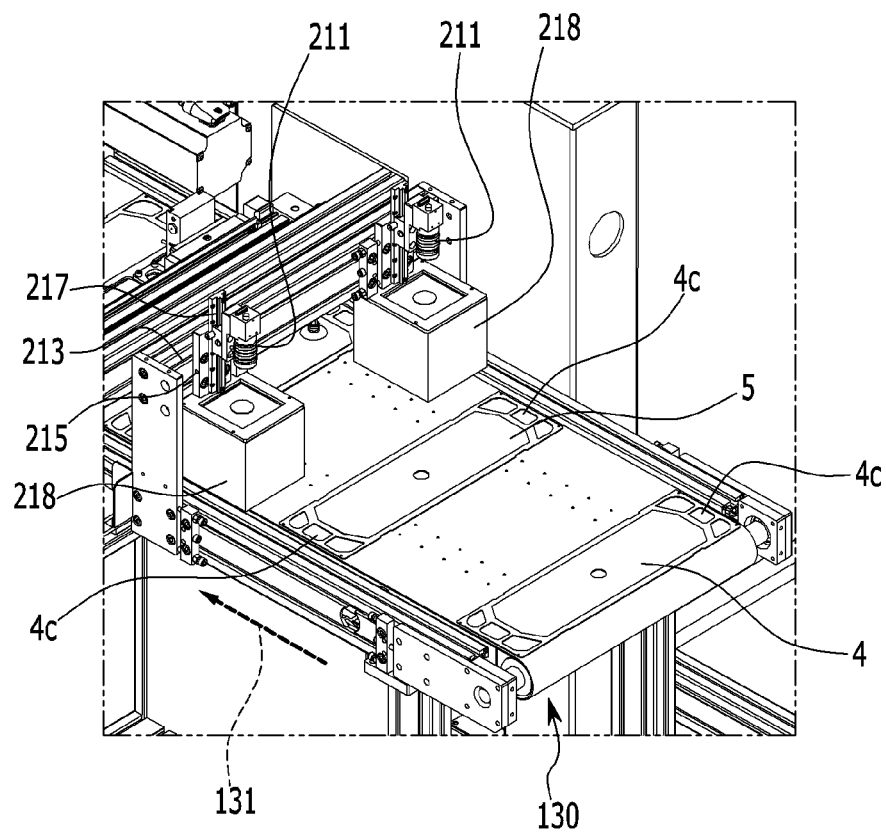
FIG. 14 is a diagram illustrating a component examining unit applied to the apparatus for automatically stacking a fuel cell stack according to the exemplary embodiment of the present disclosure.

The component examining unit 210 is installed at an upper side of the component transfer route 131 of the conveyor 130. The component examining unit 210 includes a pair of location sensing visions 211 which detect edge locations of the manifold holes 4c provided at both sides of the separating plate component 4 and the MEA sheet component 5, and output the detection signal to a controller 900 (hereinafter, see FIG. 5) as illustrated in FIG. 14.

The pair of location sensing visions 211 is provided so as to correspond to both sides in a width direction of the conveyor 130, and is movably installed in the width direction of the conveyor 130. The location sensing visions 211 are installed in a first location adjusting rail 213, which is provided in the width direction of the conveyor 130, to be slidable in the width direction of the conveyor 130. The location sensing vision 211 is installed in the first location adjusting rail 213 through a moving block 215 to be slidable in the width direction of the conveyor 130.

The location sensing vision 211 is installed so as to be movable in the vertical direction to the first location adjusting rail 213. To this end, a second location adjusting rail 217 is installed in the moving block 215 in the vertical direction. The location sensing vision 211 is coupled to the second location adjusting rail 217 so as to be vertically slidable.

Accordingly, the location sensing vision 211 may be provided so that the location sensing vision 211 may move in the width direction of the conveyor 130 along the first location adjusting rail 213, and move in the vertical direction along the second location adjusting rail 217 to adjust a location in correspondence with the manifold holes 4c of the separating plate component 4 and the MEA sheet component 5.

Since the location sensing vision 211 is formed of a vision sensor that is a known technology in the art, a more detailed description of a configuration thereof will be omitted in the present specification.

Reference numeral 218, which is not described in the drawing, represents a lighting device irradiating light to the manifold holes 4c of the separating plate component 4 and the MEA sheet component 5.

In the above, the controller 900 controls a general operation of the apparatus 100, and here, the controller 900 may receive a detection signal of the location sensing vision 211 and determine whether the separating plate component 4 and the MEA sheet component 5 are defective based on predetermined location information (location information on the edges of the manifold holes) of the separating plate component 4 and the MEA sheet component 5.

In the exemplary embodiment of the present disclosure, the defective component extracting unit 250 grips each of the separating plate component 4 and the MEA sheet component 5, which are a unit set determined to have a defect by the component examining unit 210 and the controller 900, on the conveyor 130, and extracts the gripped separating plate component 4 and MEA sheet component 5 to the outside of the conveyor 130.

Figure 15:
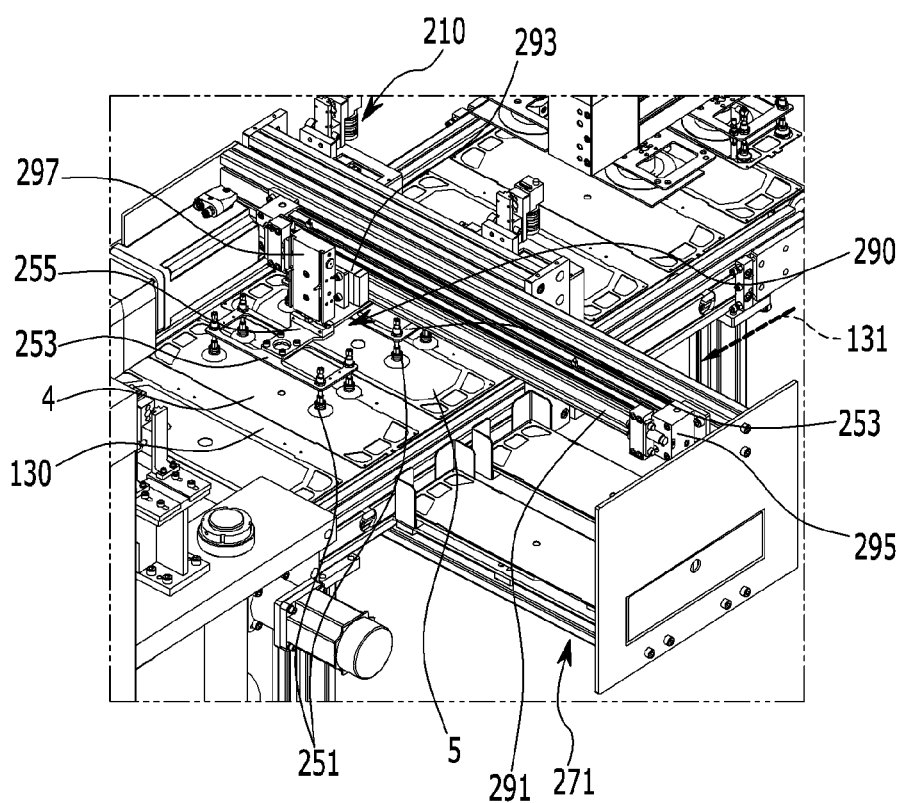
FIG. 15 is a diagram illustrating a defective component extracting unit applied to the apparatus for automatically stacking a fuel cell stack according to the exemplary embodiment of the present disclosure.

The defective component extracting unit 250 is installed at an upper side of the conveyor 130 at a rear side of the component examining unit 210, and includes a plurality of defective component extracting grippers 251 as illustrated in FIG. 15.

The defective component extracting gripper 251 may simultaneously vacuum-adsorb the separating plate component 4 and the MEA sheet component 5 as the unit set determined to have a defect, and load the components to a tray 271 provided at an external side of the conveyor 130.

The defective component extracting grippers 251 are installed at a pair of fixing brackets 253 provided so as to correspond to the separating plate component 4 and the MEA sheet component 5 as the unit set, respectively. The pair of fixing brackets 253 is integrally connected through a connecting member 255. The pair of fixing brackets 253 is installed so as to reciprocate in a direction crossing the component transfer route 131 of the conveyor 130 and is installed so as to reciprocate in the vertical direction by a second driving means 290.

Here, the second driving means 290 includes a second guide rail 291 disposed in a direction crossing the component transfer route 131 of the conveyor 130, a second slider 293 slidably coupled to the second guide rail 291, a second driving motor 295 providing driving force to the second slider 293, and a second driving cylinder 297 coupled to the second slider 293 and connected to the connecting member 255.

Accordingly, the second slider 293 moves along the second guide rail 291 by the driving of the second driving motor 295, so that the fixing bracket 253 may reciprocate in the direction crossing the component transfer route 131 of the conveyor 130. Further, the fixing bracket 253 may reciprocate in the vertical direction by the driving of the second driving cylinder 297.

In the above, the defective component extracting grippers 251 are fixedly installed at corners of each fixing bracket 253. The defective component extracting grippers 251 provide vacuum cups applying a vacuum suction force, and adsorb the separate plate component 4 and the MEA sheet component 5 as the unit set determined to have a defect with vacuum suction force.

The defective component extracting grippers 251 move from the upper side of the conveyor 130 in the down direction by the second driving means 290, and vacuum-adsorb the separate plate component 4 and the MEA sheet component 5 as the unit set determined to have a defect by the component examining unit 210 and the controller 900.

Further, the defective component extracting grippers 251 move in the up direction by the second driving means 290 in a state of vacuum-adsorbing the separating plate component 4 and the MEA sheet component 5, respectively, and move toward the tray 271 at the external side of the conveyor 130 in the direction crossing the component transfer route 131 of the conveyor 130.

Further, when the vacuum suction force is released in a state where the defective component extracting grippers 251 move in the down direction by the second driving means 290, the defective component extracting grippers 251 load the separating plate component 4 and the MEA sheet component 5 on the tray 271.

The tray 271 accommodates the separate plate component 4 and the MEA sheet component 5 as the unit set determined to have a defect, and is fixedly installed in the frame 10 at the external side of the conveyor 130.

In the exemplary embodiment of the present disclosure, the component aligning unit 310 aligns the separating plate component 4 and the MEA sheet component 5 transferred through the conveyor 130 to predetermined locations.

That is, the component aligning unit 310 aligns the separating plate component 4 and the MEA sheet component 5 transferred from the rear side to predetermined locations of the finish end of the component transfer route 131 of the conveyor 130.

Here, each of the separating plate component 4 and the MEA sheet component 5 transferred to the finish end of the component transfer route 131 of the conveyor 130 may be gripped by a component stacking unit 350, which will be described in more detail below, and loaded onto the component aligning unit 310 side.

Figure 16:
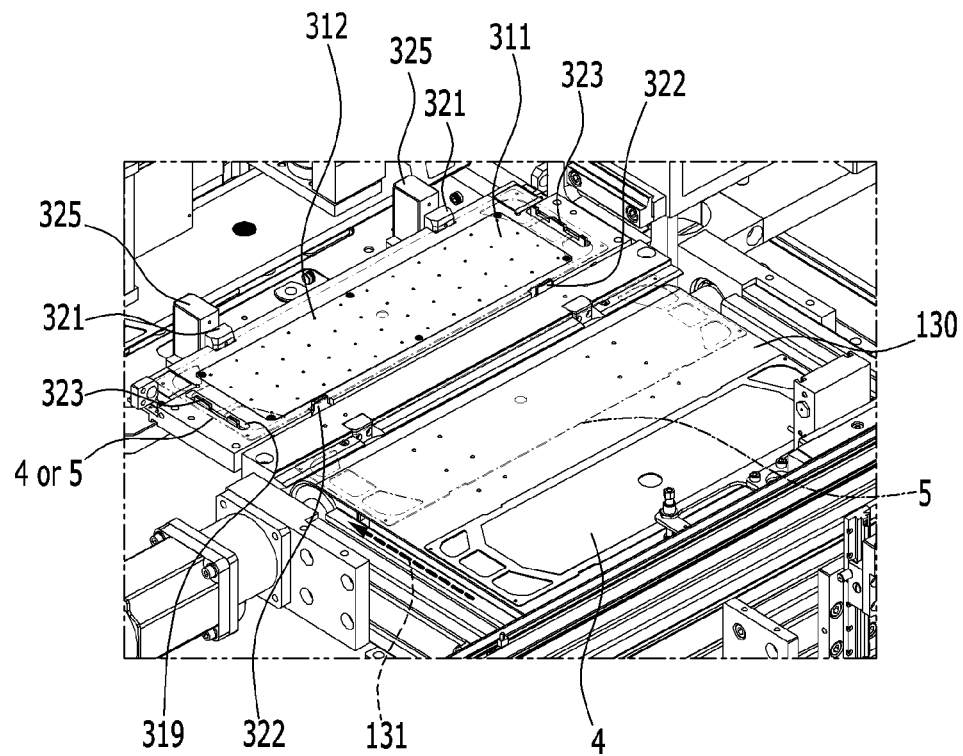
FIGS. 16 and 17 are diagrams illustrating a component aligning unit applied to the apparatus for automatically stacking a fuel cell stack according to the exemplary embodiment of the present disclosure.
Figure 17:
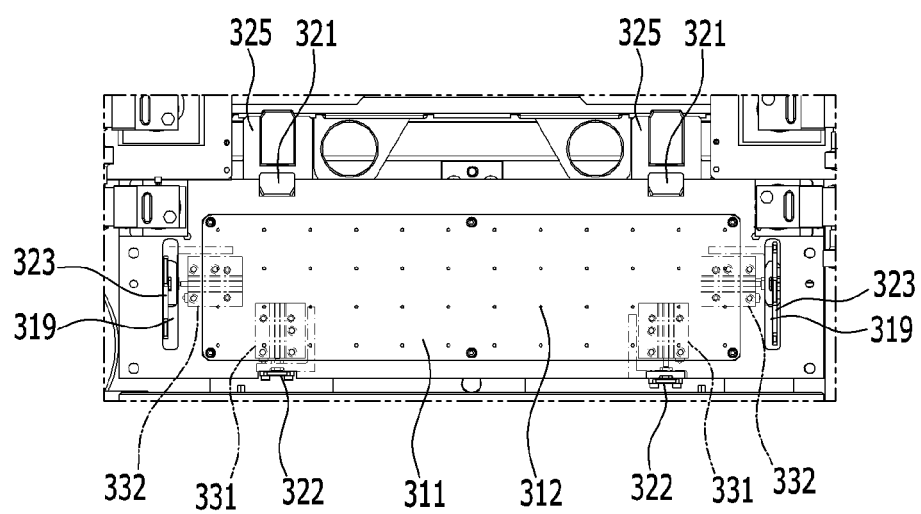

The component aligning unit 310 is installed in the frame 10 so as to be connected with the finish end of the component transfer route 131 of the conveyor 130, and includes a single base plate 311 and a plurality of touch members 321, 322, and 323 installed in the base plate 311 as illustrated in FIGS. 16 and 17.

The base plate 311 supports each of the separating plate component 4 and the MEA sheet component 5, and is fixedly installed in the frame 10 at the same height as that of the conveyor 130 at the finish end of the component transfer route 131 of the conveyor 130.

The base plate 311 is formed in a quadrangular plate shape. Here, a plurality of air exhaust holes 312 for discharging air and raising the separating plate component 4 and the MEA sheet component 5 to a predetermined height with pressure of the air are formed in the base plate 311. The air exhaust holes 312 may be connected with a compressed air supply means (not illustrated) supplying compressed air.

The touch members 321, 322, and 323 touch edge portions of the separating plate component 4 and the MEA sheet component 5 and align the components to predetermined locations in a state where the separating plate component 4 and the MEA sheet component 5 are raised while the compressed air is discharged through the air exhaust holes 312 of the base plate 311. In the exemplary embodiment of the present disclosure, the touch members 321, 322, and 323 may be divided into a first touch member 321, a second touch member 322, and a third touch member 323.

The first touch member 321 is fixedly installed at a rear external side of the base plate 311, fitted to an edge portion of the rear side of the base plate 311, and touches the edge portions of the rear sides of the separating plate component 4 and the MEA sheet component 5.

The first touch member 321 may be installed at a pair of fixed bars 325 disposed at the rear external side of the base plate 311 in the vertical direction, and fixed to the frame 10. That is, the first touch member 321 is fixedly installed in each of the fixed bars 325 at the rear external side of the base plate 311.

The second touch member 322 is installed at a front external side of the base plate 311 to be movable in a front and rear direction, fitted to an edge portion of the front side of the base plate 311, and touches the edge portions of the front sides of the separating plate component 4 and the MEA sheet component 5.

The second touch member 322 may push the separating plate component 4 and the MEA sheet component 5 from the front side to the rear side of the base plate 311 while touching the front edge portion of the separating plate component 4 and the MEA sheet component 5. To this end, the second touch member 322 is installed so as to reciprocate in the front and rear direction by a first touch cylinder 331 fixedly provided on a lower surface of the base plate 311.

The third touch member 323 is installed at both sides of the base plate 311 to be movable in the direction of the side, and touches edge portions of both sides of the separating plate component 4 and the MEA sheet component 5 while passing through both sides of the base plate 311.

The third touch member 323 may push the separating plate component 4 and the MEA sheet component 5 in the directions of both sides of the base plate 311 while touching the edge portions of both sides of the separating plate component 4 and the MEA sheet component 5. To this end, the third touch member 323 may be installed so as to reciprocate in the side direction by a second touch cylinder 332 fixedly provided on the lower surface of the base plate 311.

In this case, the third touch member 323 may protrude upward from an upper surface of the base plate 311 through a through-hole 319 formed at both sides of the base plate 311, and be installed to be connected to the second touch cylinder 332.

In the exemplary embodiment of the present disclosure, the component stacking unit 350 grips the separating plate component 4 and the MEA sheet component 5 aligned by the component aligning unit 310, and stacks the components on a stack guide 30 provided to transfer the components in the direction crossing the component transfer route 131 of the conveyor 130.

Further, the component stacking unit 350 may grip the separating plate component 4 and the MEA sheet component 5 located at the finish end of the conveyor 130 and transfer the gripped separating plate component 4 and MEA sheet component 5 to the component aligning unit 310.

The stack guide 30 is a guide mechanism for sequentially stacking the separating plate component 4 and the MEA sheet component 5, and has a structure of guiding the edge portions of the components 4 and 5 in the vertical direction.

Figure 18:
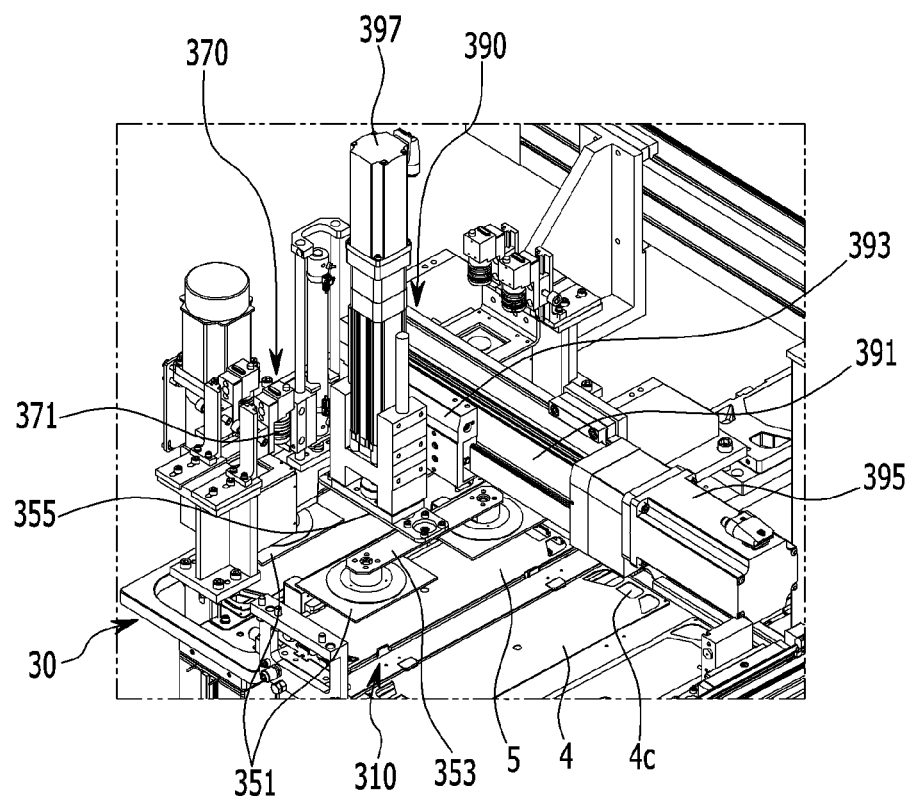
FIGS. 18 and 19 are diagrams illustrating a component stacking unit applied to the apparatus for automatically stacking a fuel cell stack according to the exemplary embodiment of the present disclosure.
Figure 19:
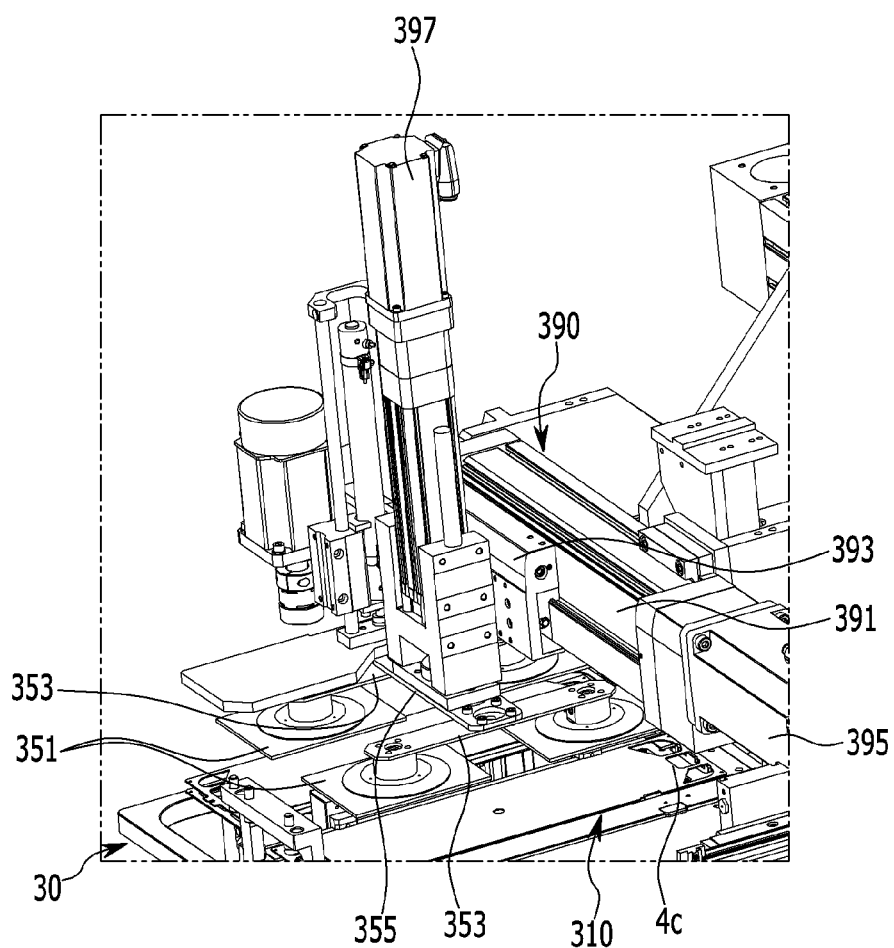

The component stacking unit 350 is configured at an upper side of the component aligning unit 310 at the finish end of the component transfer route 131 of the conveyor 130. As illustrated in FIGS. 18 and 19, the component stacking unit 350 is disposed at an upper side of a start end of a transfer route of the stack guide 30, installed so as to reciprocate in the transfer direction of the separating plate component 4 and the MEA sheet component 5, and includes a pair of stack grippers 351 installed so as to reciprocate in the vertical direction.

In this case, the transfer route of the stack guide 30 is a route along which the stack guide 30 and the components stacked on the stack guide 30 are transferred, and means a direction crossing the component transfer route 131 of the conveyor 130.

The pair of stack grippers 351 may vacuum-adsorb the separating plate component 4 and the MEA sheet component 5. Particularly, the pair of stack grippers 351 may vacuum-adsorb any one component of the separating plate component 4 and the MEA sheet component 5 located at the finish end of the conveyor 130, and load the vacuum-adsorbed component to the component aligning unit 310. Further, the pair of stack grippers 351 may vacuum-adsorb the other component located in the component aligning unit 310 and load the vacuum-adsorbed component to the stack guide 30.

The stack grippers 351 are installed at a pair of mounting brackets 353 and correspond to an upper side of the finish end of the component transfer route 131 of the conveyor 130 and the upper side of the component aligning unit 310. The pair of mounting brackets 353 are integrally connected through a connecting plate 355. Further, the pair of mounting brackets 353 is installed so as to reciprocate in the same direction as that of the component transfer route 131 of the conveyor 130 and is installed so as to reciprocate in the vertical direction by a third driving means 390.

Here, the third driving means 390 includes a third guide rail 391 disposed in the same direction as that of the component transfer route 131 of the conveyor 130, a third slider 393 slidably coupled to the third guide rail 391, a third driving motor 395 providing driving force to the third slider 393, and a third driving cylinder 397 coupled to the third slider 393 and connected with a connecting plate 355.

Accordingly, the mounting bracket 353 may reciprocate in the same direction as that of the component transfer route 131 of the conveyor 130 according to a movement of the third slider 393 along the third guide rail 391 by the driving of the third driving motor 395. Further, the mounting bracket 353 may reciprocate in the vertical direction by the driving of the third driving cylinder 397.

In the above, the stack gripper 351 may be fixedly installed into each of the mounting brackets 353. The stack gripper 351 provides a vacuum cup applying vacuum a suction force. The stack grippers 351 vacuum-adsorb any one component of the separating plate component 4 and the MEA sheet component 5 located at the finish end of the conveyor 130, and the other component located in the component aligning unit 310.

The stack grippers 351 move in the down direction by the third driving means 390 from the upper side of the finish end of the component transfer route 131 of the conveyor 130 and the upper side of the component aligning unit 310. The stack grippers 351 move in the down direction, and vacuum-adsorb any one component of the separating plate component 4 and the MEA sheet component 5 located at the finish end of the conveyor 130, and the other component located in the component aligning unit 310.

Further, the stack grippers 351 move in the up direction by the third driving means 390 in a state of vacuum-adsorbing the component, and move toward the aforementioned stack guide 30 in the same direction as that of the component transfer route 131 of the conveyor 130.

Further, when the vacuum suction force is released in the state where the stack grippers 351 move in the down direction by the third driving means 390, the stack grippers 351 may load any one component of the separating plate component 4 and the MEA sheet component 5 to the component aligning unit 310, and load the other component to the stack guide 30.

In the meantime, in the exemplary embodiment of the present disclosure, the component stacking unit 350 may further include a lifting means for moving the separating plate component 4 and the MEA sheet component 5 from the upper side to the lower side of the stack guide 30 when the separating plate component 4 and the MEA sheet component 5 are stacked on the stack guide 30 through the stack grippers 351.

The lifting means (not illustrated) may have a structure capable of moving a mechanism supporting the components of the separating plate component 4 and the MEA sheet component 5 from the upper side to the lower side or from the lower side to the upper side by driving a motor or an operation cylinder inside the stack guide 30.

In the exemplary embodiment of the present disclosure, a stack examining unit 370 examining the separating plate component 4 and the MEA sheet component 5 stacked on the stack guide 30 is installed at the component stacking unit 350 side.

The stack examining unit 370 includes vision sensors 371 fixedly installed in the frame 10 so as to correspond to a component stack region of the stack guide 30. The vision sensor 371 confirms a stack degree of the separating plate component 4 and the MEA sheet component 5 stacked on the stack guide 30. The vision sensors 371 are fixedly installed in the frame 10 so as to correspond to both manifold holes 4c of the separating plate component 4 and the MEA sheet component 5 stacked on the stack guide 30. The pair of vision sensors 371 is provided 10 so as to correspond to both manifold holes 4c of each of the separating plate component 4 and the MEA sheet component 5 stacked on the stack guide 30.

The vision sensor 371 vision-photographs both manifold holes 4c of the separating plate component 4 and the MEA sheet component 5 stacked on the stack guide 30, and outputs vision data to the controller 900 (see FIG. 5).

Accordingly, the controller 900 may receive the vision data of the vision sensor 371, and determine whether a stack degree of the components is poor based on a predetermined stack degree of the separating plate component 4 and the MEA sheet component 5.

When the controller 900 determines that the stack degree of the separating plate component 4 and the MEA sheet component 5 is poor, the aforementioned component stacking unit 350 may be controlled by the controller 900 and extract the separating plate component 4 and the MEA sheet component 5 from the stack guide 30.

In the exemplary embodiment of the present disclosure, the component pressurizing unit 410 pressurizes the separating plate components 4 and the MEA sheet components 5 continuously stacked on the stack guide 30 by the component stacking unit 350.

That is, in a state where the separating plate components 4 and the MEA sheet components 5 are continuously stacked on the stack guide 30, and the stack guide 30 is transferred along the transfer route (the transfer route of the stack guide), the component pressurizing unit 410 may pressurize the separating plate components 4 and the MEA sheet components 5 stacked on the stack guide 30 by a press method.

Figure 20:
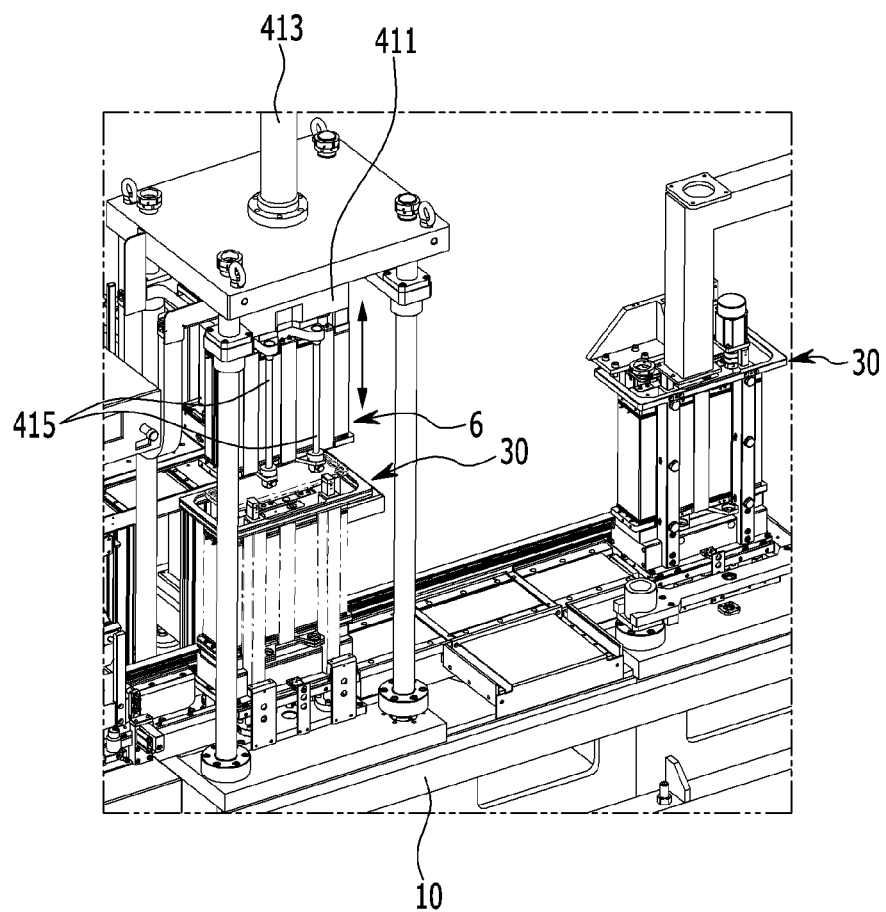
FIGS. 20 and 21 are diagrams illustrating a component pressurizing unit applied to the apparatus for automatically stacking a fuel cell stack according to the exemplary embodiment of the present disclosure.
Figure 21:
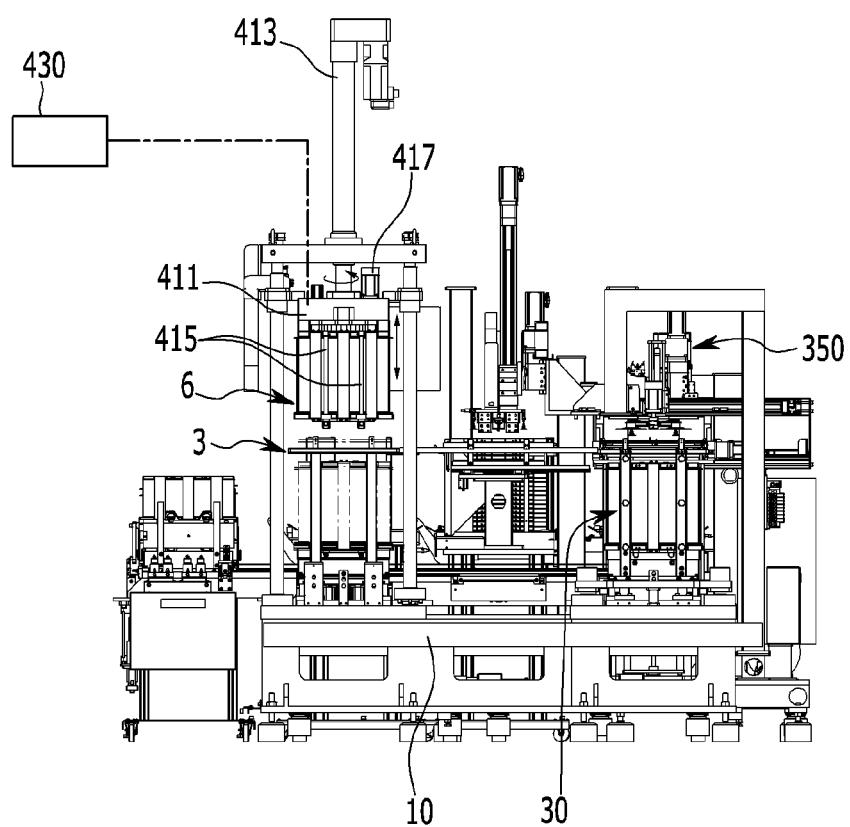

The component pressurizing unit 410 is provided at the upper side of the transfer route of the stack guide 30, so that the component pressurizing unit 410 includes a press member 411 installed so as to reciprocate in the vertical direction as illustrated in FIGS. 20 and 21.

The press member 411 is installed in the frame 10, disposed at the upper side of the transfer route of the stack guide 30, and installed so as to reciprocate in the vertical direction to an inner side of the stack guide 30. The press member 411 may be installed so as to reciprocate in the vertical direction by the press cylinder 413. The press cylinder 413 is fixedly installed in the frame 10, and may make the press member 411 reciprocate in the vertical direction by forward/backward operations.

A pair of fixing rods 415 for fixing the stack body 6, in which the separating plate components 4 and the MEA sheet components 5 are stacked, separately from the stack guide 30, is installed in the press member 411.

An upper end of the fixing rod 415 may be fixed to the press member 411, and a lower end of the fixing rod 415 may be coupled with a part supporting the lowermost part of the stack body 6 inside the stack guide 30.

Accordingly, in the exemplary embodiment of the present disclosure, the part supporting the lowermost part of the stack body 6 may be coupled to the lower end of the fixing rod 415 in a state where the separating plate components 4 and the MEA sheet components 5 stacked on the stack guide 30 are pressurized through the press member 411.

In this state, when the press member 411 moves in the up direction through a press cylinder 413, the stack body 6 may be separated to the external side (upper side) of the stack guide 30.

In the meantime, in the exemplary embodiment of the present disclosure, the press member 411 may be supported by the press cylinder 413, and installed to be rotatable by a press motor 417. That is, the press member 411 may be rotated 360° by the press motor 417 in a state of moving in the up direction by the press cylinder 413.

The press member 411 is installed to be rotatable by the press motor 417 in order to mount the aforementioned insulating plate 8 and the fastening bar 9 in the stack body 6 while rotating the stack body 6 in a state where the stack body 6 is separated to the external side (upper side) from the stack guide 30 as described above.

On the other hand, an air-tightness examining unit 430 may be installed so as to be connected to the press member 411 according to the exemplary embodiment of the present disclosure. The air-tightness examining unit 430 examines air-tightness of the stack body 6 while supplying a fluid to the stack body 6 of the separating plate components 4 and the MEA sheet components 5 pressurized by the press member 411.

The air-tightness examining unit 430 may supply hydrogen gas, air, and a cooling medium to the separating plate component 4 and the MEA sheet component 5 of the stack body 6, measure pressure of the hydrogen gas, the air, and the cooling medium of the separating plate component 4 and the MEA sheet component 5, and examine air-tightness of the stack body 6.

In the exemplary embodiment of the present disclosure, the end plate loading unit 450 grips the upper and lower end plates 7 configuring the fuel cell stack 1 and loads the gripped end plates 7 onto the stack guide 30.

That is, the end plate loading unit 450 may grip the end plates 7 separately accommodated in the frame 10 one by one and load the gripped end plate 7 to the stack guide 30 in an unloaded state. The end plate 7 loaded onto the stack guide 30 in the unloaded state may be provided as a lower end plate.

Further, the end plate loading unit 450 may load the end plate to the stack guide 30, in which the separating plate components 4 and the MEA sheet components 5 are stacked by the component stacking unit 350. The end plate 7 loaded onto the stack guide 30, on which the separating plate components 4 and the MEA sheet components 5 are stacked, may be provided as an upper end plate. Further, the upper and lower end plates 7 may be fastened through the aforementioned fastening bar 9.

Figure 22:
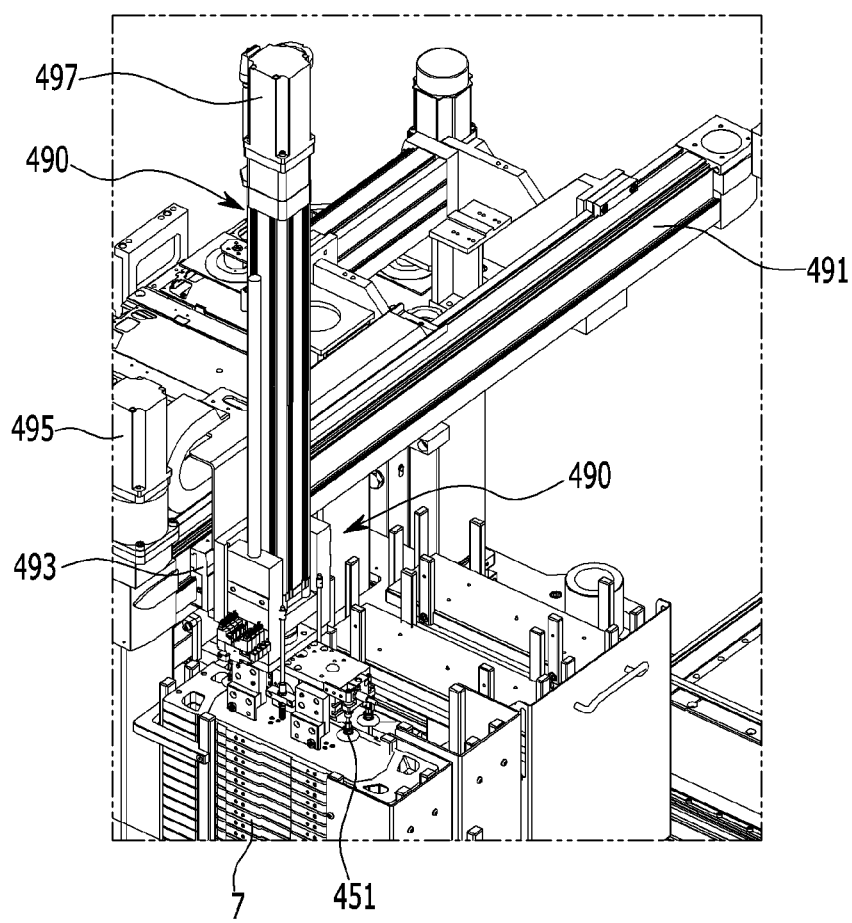
FIG. 22 is a diagram illustrating an end plate loading unit applied to the apparatus for automatically stacking a fuel cell stack according to the exemplary embodiment of the present disclosure.

The end plate loading unit 450 may be provided at the external side of the transfer route of the stack guide 30 between the component stacking unit 350 and the component pressurizing unit 410, so that the end plate loading unit 450 may include end plate grippers 451 vacuum-adsorbing the end plate 7 as illustrated in FIG. 22.

The end plate gripper 451 may grip the end plate 7 separately accommodated at the external side of the transfer route of the stack guide 30 and load the end plate 7 to the stack guide 30 on the transfer route of the stack guide 30. The end plate gripper 451 provides a vacuum cup applying a vacuum suction force, and adsorbs the end plate 7 with the vacuum suction force.

The end plate gripper 451 is installed so as to reciprocate in the direction crossing the transfer route of the stack guide 30 by a fourth driving means 490, and is installed so as to reciprocate in the vertical direction.

Here, the fourth driving means 490 includes a fourth guide rail 491 disposed in the direction crossing the transfer route of the stack guide 30, a fourth slider 493 slidably coupled to the fourth guide rail 491, a fourth driving motor 495 providing driving force to the fourth slider 493, and a fourth driving cylinder 497 coupled to the fourth slider 493 and connected with the end plate gripper 451.

Accordingly, the end plate gripper 451 may reciprocate in the direction crossing the transfer route of the stack guide 30 according to a straight movement of the fourth slider 493 along the fourth guide rail 491 by the driving of the fourth driving motor 495. Further, the end plate gripper 451 may reciprocate in the vertical direction by the driving of the fourth driving cylinder 497.

The end plate gripper 451 moves in the down direction by the fourth driving means 490 from the upper sides of the end plates 7 separately accommodated at the external side of the transfer route of the stack guide 30, and vacuum-adsorbs the end plate 7.

Further, the end plate gripper 451 moves in the up direction by the fourth driving means 490 in a state of vacuum-adsorbing the end plate 7, and moves in the direction crossing the transfer route of the stack guide 30. That is, the end plate gripper 451 moves toward the stack guide 30 on the transfer route from the external side of the transfer route of the stack guide 30.

Further, when vacuum suction force is released in the state where the end plate gripper 451 moves in the down direction by the fourth driving means 490, the end plate gripper 451 loads the end plate 7 onto the stack guide 30.

In the exemplary embodiment of the present disclosure, the transferring unit 510 transfers the stack guide 30, on which the separating plate component 4 and the MEA sheet component 5 are stacked by the component stacking unit 350, from the start end of the transfer route of the stack guide 30 to the component pressurizing unit 410 side.

Further, the transferring unit 510 transfers the stack body 6, in which the separating plate components 4 and the MEA sheet components 5 are stacked by the component pressurizing unit 410, from the component pressurizing unit 410 to the finish end of the transfer route of the stack guide 30, separately from the stack guide 30.

Figure 23:
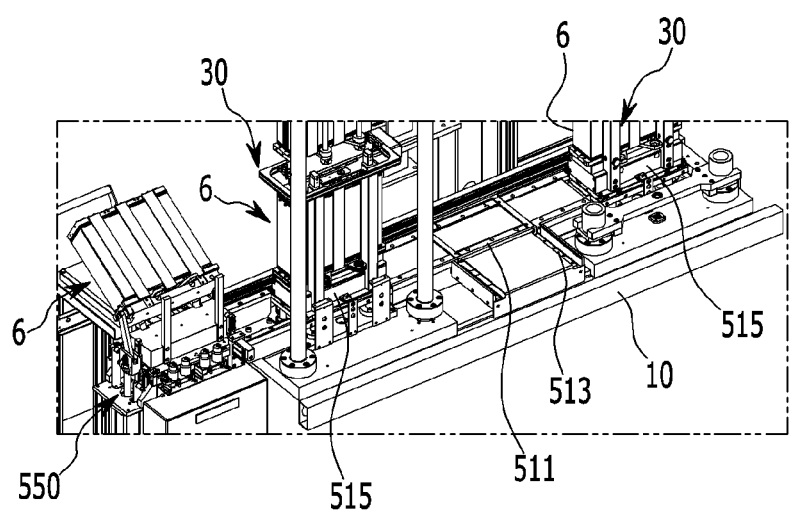
FIG. 23 is a diagram illustrating a transferring unit applied to the apparatus for automatically stacking a fuel cell stack according to the exemplary embodiment of the present disclosure.

The transferring unit 510 may include a first transfer rail 511, a second transfer rail 513, and first transfer stages 515 as illustrated in FIG. 23.

The first transfer rail 511 is installed in the frame 10 of the sides of the component stacking unit 350 and the component pressurizing unit 410. The first transfer rail 511 connects the start end and the finish end of the transfer route of the stack guide 30, and is disposed in the direction crossing the component transfer route 131 of the conveyor 130.

The second transfer rail 513 is connected with the first transfer rail 511 while crossing the first transfer rail 511 in a direction away from the end plate loading unit 450 between the component stacking unit 350 and the component pressurizing unit 410.

Further, a pair of first transfer stages 515 is provided so as to correspond to the component stacking unit 350 and the component pressurizing unit 410, respectively. The first transfer stages 515 are installed so as to support the stack guide 30 between the component stacking unit 350 and the component pressurizing unit 410 and move along the first and second transfer rails 511 and 513.

The first transfer stage 515 may be slidably coupled to the first and second transfer rails 511 and 513 through a separate driving means (not illustrated). Since the driving means is formed of a rail slide moving device that is a publicly known technology widely known in the art, a more detailed description of a configuration thereof will be omitted in the present specification.

Accordingly, in the exemplary embodiment of the present disclosure, the stack guide 30 may move along the first and second transfer rails 511 and 513 between the component stacking unit 350 and the component pressurizing unit 410 in a state of being supported through the first transfer stage 515.

Further, the aforementioned end plate loading unit 450 may load the lower end plate 7 to the stack guide 30 in the unloaded state, in which the stack body 6 is separated, on the first transfer rail 511 between the component stacking unit 350 and the component pressurizing unit 410.

Further, the end plate loading unit 450 may load the upper end plate 7 to the stack guide 30, on which the separating plate component 4 and the MEA sheet component 5 are stacked by the component stacking unit 350.

Here, the second transfer rail 513 may be provided as an evasion section for evading the stack guide 30, onto which the lower end plate 7 is loaded, from the first transfer rail 511 through the first transfer stage 515.

Particularly, the component pressurizing unit 410 pressurizes the separating plate component 4 and the MEA sheet component 5 stacked on the stack guide 30 through the press member 411, and lifts the stack body 6 of the components and separates the stack body 6 from the stack guide 30 while the separating plate component 4 and the MEA sheet component 5 are stacked on the stack guide 30 through the component stacking unit 350.

Then, the component pressurizing unit 410 loads the stack body 6 onto a stack discharging unit 550, which is to be described below, in a state where the stack body 6 is rotated through the component pressurizing unit 410 and the insulating plate 8 and the fastening bar 9 are mounted to the stack body 6.

The stack guide 30, from which the stack body 6 is separated, moves toward the end plate loading unit 450 along the first transfer rail 511 through the first transfer stage 515, and the end plate loading unit 450 loads the lower end plate 7 onto the stack guide 30 in the unloaded state.

Further, the stack guide 30, onto which the lower end plate 7 is loaded, moves along the first transfer rail 511 through the first transfer stage 515 and enters the second transfer rail 513 of the evasion section. Then, the stack guide 30, on which the separating plate component 4 and the MEA sheet component 5 are stacked by the component stacking unit 350, moves toward the end plate loading unit 450 along the first transfer rail 511 through the first transfer stage 515. The end plate loading unit 450 loads the upper end plate 7 onto the stack guide 30, on which the separating plate component 4 and the MEA sheet component 5 are stacked.

Accordingly, the stack guide 30, onto which the end plate 7 is loaded, moves toward the component pressurizing unit 410 along the first transfer rail 511 through the first transfer stage 515, and the stack guide 30 evaded at the second transfer rail 513 moves toward the component stacking unit 350 along the first transfer rail 511 through the first transfer stage 515.

In the meantime, as described above, the component pressurizing unit 410 may separate the stack body 6, on which the separating plate component 4 and the MEA sheet component 5 are stacked, from the stack guide 30, and mount the insulating plate 8 and the fastening bar 9 to the stack body 6, and may load the stack body 6 as the fuel cell stack 1 onto the stack discharging unit 550, which is to be described in more detail below.

In the exemplary embodiment of the present disclosure, the stack discharging unit 550 discharges the stack body 6 assembled as the fuel cell stack 1 from the component pressurizing unit 410 to the outside of the transfer route of the stack guide 30.

Figure 24:
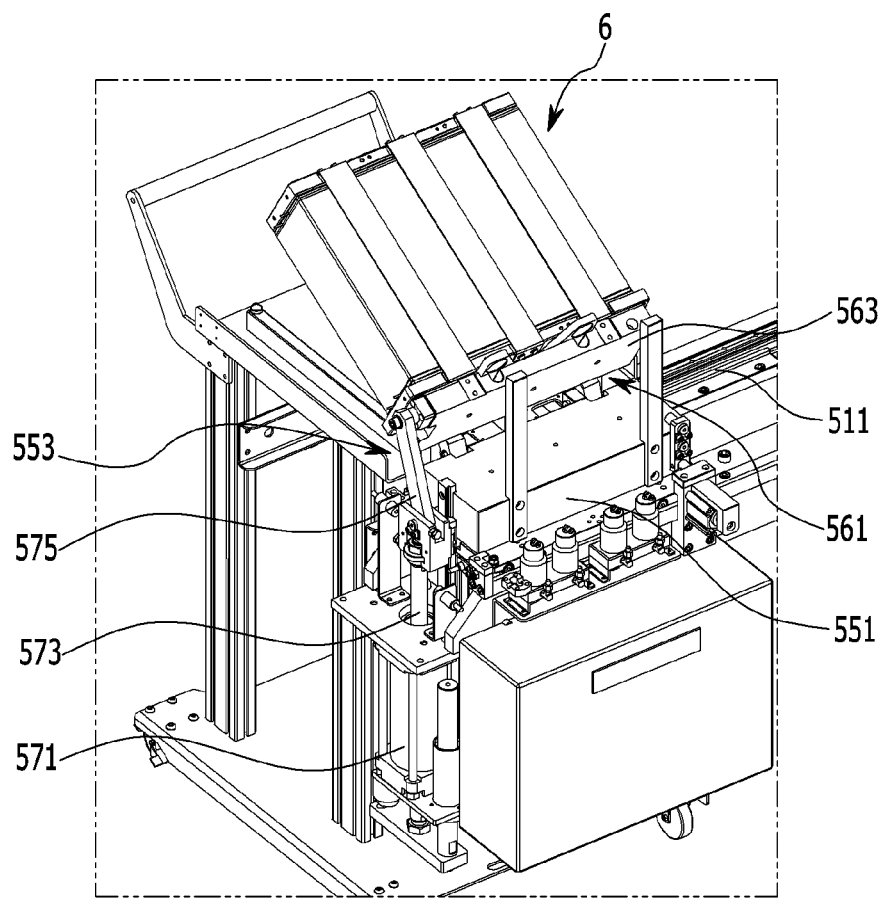
FIGS. 24 and 25 are diagrams illustrating a stack discharging unit applied to the apparatus for automatically stacking a fuel cell stack according to the exemplary embodiment of the present disclosure.
Figure 25:
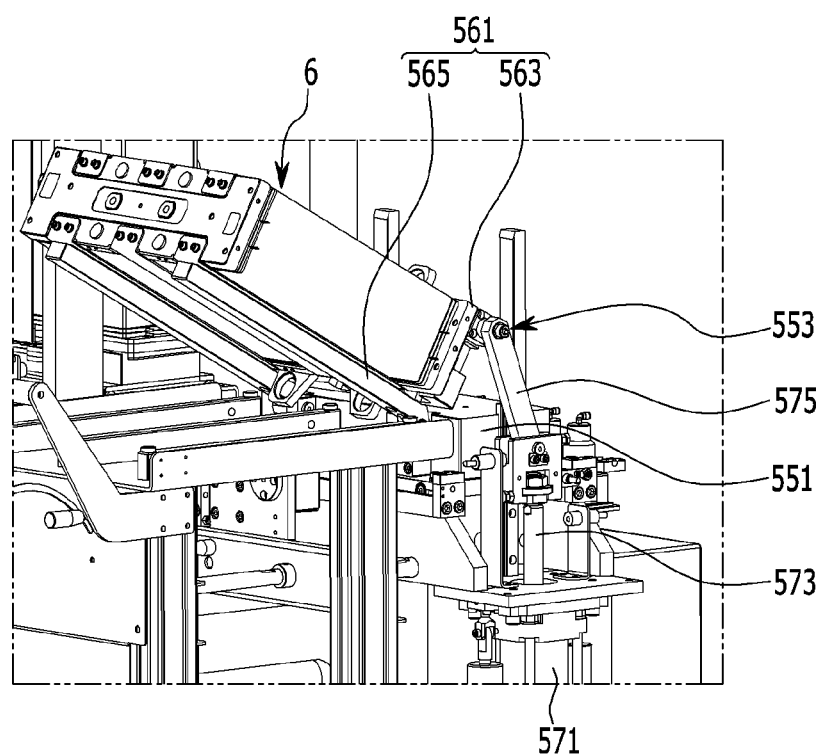

The stack discharging unit 550 is configured to be movable from the component pressurizing unit 410 side to the finish end of the transfer route of the stack guide 30, so that the stack discharging unit 550 includes the second transfer stage and a tilting discharging unit 553 as illustrated in FIGS. 24 and 25.

The second transfer stage 551 is installed to be movable along a section from the component pressurizing unit 410 to the finish end of the first transfer rail 511 between the start end and the finish end of the first transfer rail 511.

The second transfer stage 551 supports the stack body 6 unloaded by the component pressurizing unit 410, and may move along the section from the component pressurizing unit 410 to the finish end of the first transfer rail 511.

The second transfer stage 551 may be slidably coupled to the first transfer rail 511 through a separate driving means (not illustrated). Since the driving means is formed of a rail slide moving device that is a known technology, a more detailed description of a configuration thereof will be omitted in the present specification.

The tilting discharging unit 553 discharges the stack body 6 as the fuel cell stack 1 to the outside of the first transfer rail 511 while tilting the stack body 6, and is installed in the second transfer stage 551.

The tilting discharging unit 553 includes a tilt bracket 561 and a tilt operating cylinder 571. The tilt bracket 561 supports the stack body 6 and is rotatably installed in the second transfer stage 551.

The tilt bracket 561 includes a holding plate 563 holding a lower side of the stack body 6, and a pair of supports 565 supporting a lateral surface of a discharged stack body 6. The pair of supports 565 is fixedly coupled to the holding plate 563, and is rotatably hinge-coupled to the second transfer stage 551.

The tilt operating cylinder 571 is fixedly installed in the second transfer stage 551. The tilt operating cylinder 571 includes an operating rod 573 operating forward and backward in the vertical direction. The operating rod 573 is installed to be connected to the holding plate 563 of the tilt bracket 561 through the connection rod 575. Both ends of the connection rod 575 are hinge-coupled to a leading end of the operating rod 573 and the holding plate 563, respectively.

An operation of the apparatus 100 for automatically stacking a fuel cell stack according to the exemplary embodiment of the present disclosure as described above will be described with reference to the previously disclosed drawings in detail.

First, in the exemplary embodiment of the present disclosure, the first magazine 111, in which the separating plate components 4 are accommodated, and the second magazine 112, in which the MEA sheet components 5 are accommodated, are loaded onto the support frame 115 of the lift unit 110.

In this case, the first magazine 111 and the second magazine 112 may be transferred to the lift unit 110 through a first trolley 801, and loaded onto the support frame 115. Further, in addition to the pair of first and second magazines 111 and 112, another pair of first and second magazines 111 and 112 and yet another pair of first and second magazines 111 and 112 are serially loaded onto the lift support frame 115.

In this state, in the exemplary embodiment of the present disclosure, one of the separating plate components 4 of the first magazine 111 and one of the MEA sheet components 5 of the second magazine 112 are simultaneously picked up through the first and second component grippers 153 and 155 of the component pick-up unit 150, and the components 4 and 5 are loaded onto the start end of the component transfer route 131 of the conveyor 130.

Here, the first and second component grippers 153 and 155 move toward the first and second magazines 111 and 112 and move in the down direction by the first driving means 190, and vacuum-adsorb the separating plate component 4 and the MEA sheet component 5 accommodated in the first and second magazines 111 and 112, respectively.

Then, the first and second component grippers 153 and 155 move in the up direction by the first driving means 190 in a state of vacuum-adsorbing the separating plate component 4 and the MEA sheet component 5, respectively, and move to the start end of the conveyor 130.

Then, when the vacuum suction force is released in the state where the first and second component grippers 153 and 155 move in the down direction by the first driving means 190, the first and second component grippers 153 and 155 load the separating plate component 4 and the MEA sheet component 5 onto the start end of the component transfer route 131 of the conveyor 130.

In the process of continuously loading the separating plate component 4 and the MEA sheet component 5 of the first and second magazines 111 and 112 onto the conveyor 130 through the component pick-up unit 150, in the exemplary embodiment of the present disclosure, the lift plate 113 within the first and second magazines 111 and 112 moves in the up direction through the lift driving means 125 of the lift unit 110.

The separating plate component 4 and the MEA sheet component 5 accommodated in the first and second magazines 111 and 112, respectively, move in the upper direction by the lift plate 113 at the time of being unloaded by the first and second component grippers 153 and 155.

Accordingly, the first and second component grippers 153 and 155 always move along a predetermined route through the first driving means 190, and grip the separating plate component 4 and the MEA sheet component 5 of the first and second magazines 111 and 112 and load the gripped separating plate component 4 and MEA sheet component 5 onto the conveyor 130.

In the meantime, in the exemplary embodiment of the present disclosure, when the separating plate component 4 within the first magazine 111 is vacuum-adsorbed through the first component gripper 153 as described above, the paper 169 interposed between the separating plate components 4 is simultaneously vacuum-adsorbed through the paper gripper 161. In this case, the paper gripper 161 may vacuum-adsorb the paper 169 through the manifold holes 4c of the separating plate component 4.

Then, in the exemplary embodiment of the present disclosure, the separating plate component 4 is vacuum-adsorbed through the first component gripper 153, and simultaneously the paper 169 is vacuum-adsorbed through the paper gripper 161, and the separating plate component 4 moves toward the start end of the component transfer route 131 of the conveyor 130.

In this process, in the exemplary embodiment of the present disclosure, in a state where the vacuum suction force of the paper gripper 161 is released, the paper 169 is separated from the separating plate component 4 and the paper gripper 161 through the paper separating member 171. The paper separating member 171 may operate forward and backward through the manifold holes 4c of the separating plate component 4, and separate the separating plate component 4 and the paper 169 from the paper gripper 161.

The separating plate component 4 and the paper 169 separated from the paper gripper 161 may freely fall as described above, and be collected to the paper collecting container 175 between the first and second magazines 111 and 112 and the start end of the component transfer route 131 of the conveyor 130.

In the meantime, the separating plate component 4 and the MEA sheet component 5 loaded onto the start end of the component transfer route 131 of the conveyor 130 through the first and second component grippers 153 and 155 of the component pick-up unit 150 are transferred along the component transfer route 131 by the conveyor 130.

In the exemplary embodiment of the present disclosure, in the process in which the separating plate component 4 and the MEA sheet component 5 are transferred along the component transfer route 131 by the conveyor 130, a damage, a seating state, and the like of the separating plate component 4 and the MEA sheet component 5 are examined through the component examining unit 210.

The component examining unit 210 detects edge locations of the manifold holes 4c of the separating plate component 4 and the MEA sheet component 5 through the pair of location sensing visions 211 and outputs the detection signal to the controller 900.

Then, the controller 900 receives the detection signal of the location sensing vision 211, and determines whether the separating plate component 4 and the MEA sheet component 5 have defects based on the predetermined location information (edge location information of the manifold hole) of the separating plate component 4 and the MEA sheet component 5.

In the exemplary embodiment of the present disclosure, the location sensing vision 211 moves in a width direction of the conveyor 130 through the first location adjusting rail 213, and moves in the vertical direction through the second location adjusting rail 217, so that the location of the location sensing vision 211 may be adjusted in accordance with the manifold holes 4c of the separating plate component 4 and the MEA sheet component 5.

When the controller 900 determines that at least one of the separating plate component 4 and the MEA sheet component 5 has a defect, in the exemplary embodiment of the present disclosure, the separating plate component 4 and the MEA sheet component 5, which are a unit set determined to have a defect, are vacuum-adsorbed on the conveyor 130 through the defective component extracting grippers 251 of the defective component extracting unit 250 and loaded onto the tray 271 at the external side of the conveyor 130.

Here, the defective component extracting grippers 251 move in the down direction by the second driving means 290 from the upper side of the conveyor 130, and vacuum-adsorb the separating plate component 4 and the MEA sheet component 5 that is the unit set determined to have the defect.

Then, the defective component extracting grippers 251 move in the up direction by the second driving means 290 in a state of vacuum-adsorbing the separating plate component 4 and the MEA sheet component 5, respectively, and move toward the tray 271 at the external side of the conveyor 130 along the direction crossing the component transfer route 131 of the conveyor 130.

Then, when the vacuum suction force is released, the defective component extracting grippers 251 load the separating plate component 4 and the MEA sheet component 5 onto the tray 271 in a state of moving in the down direction by the second driving means 290.

After the aforementioned process, in the exemplary embodiment of the present disclosure, the separating plate component 4 or the MEA sheet component 5 transferred to the finish end of the component transfer route 131 of the conveyor 130 is loaded onto the base plate 311 of the component aligning unit 310 through the stack gripper 351 of the component stacking unit 350. An operation of the stack gripper 351 will be described below in more detail.

Then, the base plate 311 of the component aligning unit 310 discharges compressed air through the air exhaust holes 312, and raises the separating plate component 4 or the MEA sheet component 5 to a predetermined height.

In the exemplary embodiment of the present disclosure, in the state where the separating plate component 4 or the MEA sheet component 5 is raised above the base plate 311, the touch members 321, 322, and 323 of the component aligning unit 310 align the separating plate component 4 or the MEA sheet component 5 to predetermined locations while touching edge portions of the separating plate component 4 or the MEA sheet component 5.

Here, the first touch member 321 touches a rear edge portion of the separating plate component 4 or the MEA sheet component 5 in a state of being fixed to a rear external side of the base plate 311.

The second touch member 322 reciprocates in the front and rear direction by the first touch cylinder 331. Then, the second touch member 322 pushes the separating plate component 4 or the MEA sheet component 5 from the front side to the rear side of the base plate 311 while touching the front edge portion of the separating plate component 4 or the MEA sheet component 5.

Then, the third touch member 323 reciprocates in a side direction by the second touch cylinder 332. Then, the third touch member 323 pushes the separating plate component 4 or the MEA sheet component 5 in both side directions of the base plate 311 while touching both side edge portions of the separating plate component 4 or the MEA sheet component 5.

In the exemplary embodiment of the present disclosure, the separating plate component 4 and the MEA sheet component 5 are stacked on the stack guide 30 through the stack gripper 351 of the component stacking unit 350 in a state where the positions of the separating plate component 4 and the MEA sheet component 5 are aligned by the component aligning unit 310.

In the meantime, the stack gripper 351 of the component stacking unit 350 grips any one component of the separating plate component 4 and the MEA sheet component 5, which are aligned by the component aligning unit 310 as one pair, and simultaneously grips the other one of the separating plate component 4 and the MEA sheet component 5 located at the finish end of the conveyor 130.

That is, the stack gripper 351 may grip any one component, and stack the gripped component on the stack guide 30 provided so as to be transferrable in the direction crossing the component transfer route 131 of the conveyor 130. Then, the stack gripper 351 may grip the other component and transfer the gripped component to the component aligning unit 310.

The pair of stack guides 30 is provided, and may guide and stack the separating plate component 4 and the MEA sheet component 5 loaded through the stack grippers 351. Any one of the pair of stack guides 30 is located at the start end of the first transfer rail 511 through the first transfer stage 515 of the transferring unit 510. In this case, the lower end plate 7 has been loaded onto the one stack guide 30 through the end plate loading unit 450.

Accordingly, the pair of stack grippers 351 moves in the down direction by the third driving means 390 from the upper side of the finish end of the component transfer route 131 of the conveyor 130 and the upper side of the component aligning unit 310. Then, the stack grippers 351 vacuum-adsorb any one component of the separating plate component 4 and the MEA sheet component 5 located at the finish end of the conveyor 130, and the other component located in the component aligning unit 310.

Then, the stack grippers 351 move in the up direction by the third driving means 390 in a state of vacuum-adsorbing the separating plate component 4 and the MEA sheet component 5, and move toward any one of the aforementioned stack guides 30 in the same direction as that of the component transfer route 131 of the conveyor 130.

Then, when the vacuum suction force is released in the state where the stack grippers 351 move in the down direction by the third driving means 390, the stack grippers 351 load any one component of the separating plate component 4 and the MEA sheet component 5 to the component aligning unit 310, and load the other component to any one of the stack guides 30.

In the exemplary embodiment of the present disclosure, in the process of stacking the separating plate component 4 and the MEA sheet component 5 on any one of the stack guides 30, the stack examining unit 370 examines stack degrees of the separating plate component 4 and the MEA sheet component 5 stacked on the stack guide 30.

The stack examining unit 370 vision-photographs both manifold holes 4c of the separating plate component 4 and the MEA sheet component 5 stacked on the stack guide 30 through the vision sensor 371, and outputs vision data to the controller 900.

The controller 900 receives the vision data of the vision sensor 371, and determines whether a stack degree of the components is poor based on predetermined stack degrees of the separating plate component 4 and the MEA sheet component 5.

Here, when the controller 900 determines that the stack degree of the separating plate component 4 and the MEA sheet component 5 is poor, the stack grippers 351 of the component stacking unit 350 are controlled by the controller 900, and extract the separating plate component 4 and the MEA sheet component 5 from the stack guide 30, in which the stack degree is determined to be poor. Then, the stack grippers 351 of the component stacking unit 350 are controlled by the controller 900, and re-insert another separating plate component 4 and another MEA sheet component 5 to the stack guide 30.

In the process of stacking the separating plate component 4 and the MEA sheet component 5 in any one stack guide 30 as described above, in the exemplary embodiment of the present disclosure, the other stack guide 30 in the unloaded state is transferred to the end plate loading unit 450 between the component stacking unit 350 and the component pressurizing unit 410 through the first transfer stage 515. In this case, the first transfer stage 515 is transferred to the end plate loading unit 450 along the first transfer rail 511.

Then, the end plate gripper 451 of the end plate loading unit 450 grips the end plates 7 separately accommodated in the frame 10 one by one, and loads the lower end plate 7 onto the other stack guide 30.

Here, in the exemplary embodiment of the present disclosure, after the lower end plate 7 is loaded onto the other stack guide 30 through the end plate gripper 451, dummy cells (not illustrated) separately accommodated in the frame 10 may be manually stacked on the lower end plate 7. The dummy cells are provided as buffer cells, which do not serve as fuel cells at all, and serve to reinforce strength and durability of the entire fuel cell stack.

Then, in the exemplary embodiment of the present disclosure, the other stack guide 30, onto which the lower end plate 7 is loaded, is transferred to the second transfer rail 513 in a direction crossing the first transfer rail 511 through the first transfer stage 515. That is, in the exemplary embodiment of the present disclosure, the other stack guide 30, onto which the lower end plate 7 is loaded, is evaded to the evasion section of the second transfer rail 513 from the first transfer rail 511.

On the other hand, in the exemplary embodiment of the present disclosure, in the state where the separating plate component 4 and the MEA sheet component 5 are stacked on any one stack guide 30 by the stack grippers 351, the stack guide 30, on which the separating plate component 4 and the MEA sheet component 5 are stacked, is transferred to the end plate loading unit 450 between the component stacking unit 350 and the component pressurizing unit 410 through the first transfer stage 515. In this case, the first transfer stage 515 is transferred to the end plate loading unit 450 along the first transfer rail 511.

Then, the end plate gripper 451 of the end plate loading unit 450 grips the end plates 7 separately accommodated in the frame 10 one by one, and loads the upper end plate 7 onto the stack guide 30 on which the separating plate component 4 and the MEA sheet component 5 are stacked.

Here, the aforementioned end plate gripper 451 moves in the down direction by the fourth driving means 490 from the upper sides of the end plates 7 separately accommodated at the external side of the transfer route of the stack guide 30, and vacuum-adsorbs the end plate 7.

Then, the end plate gripper 451 moves in the up direction by the fourth driving means 490 in a state of vacuum-adsorbing the end plate 7, and moves in the direction crossing the transfer route of the stack guide 30.

Then, when the vacuum suction force is released in a state where the end plate gripper 451 moves in the down direction by the fourth driving means 490, the end plate gripper 451 loads the lower end plate 7 onto the stack guide 30 in the unloaded state or loads the upper end plate 7 to the stack guide 30 on which the separating plate component 4 and the MEA sheet component 5 are stacked.

As described above, when the upper and lower end plates 7 are loaded onto the stack guide 30 through the end plate grippers 451 and thus the end plates 7 separately accommodated in the frame 10 are removed, the end plates 7 may be inserted into the frame 10 through a second trolley 802 in the exemplary embodiment of the present disclosure.

In the exemplary embodiment of the present disclosure, before the upper end plate 7 is loaded onto the stack guide 30 through the end plate gripper 451, the aforementioned dummy cells (not illustrated) may also be manually stacked on the stack guide 30.

On the other hand, in the exemplary embodiment of the present disclosure, in the state where the upper and lower end plates 7, the separating plate component 4, and the MEA sheet component 5 are stacked on the stack guide 30, the stack guide 30 is transferred toward the component pressurizing unit 410 along the first transfer rail 511 through the first transfer stage 515.

In this process, in the exemplary embodiment of the present disclosure, the stack guide 30 in the unloaded state, which is evaded to the evasion section of the second transfer rail 513 in a state of being loaded with the lower end plate 7, is transferred toward the component stacking unit 350 along the first transfer rail 511 through the first transfer stage 515.

In the exemplary embodiment of the present disclosure, in a state where the stack guide 30, on which the upper and lower end plates 7, the separating plate component 4, and the MEA sheet component 5 are stacked, is transferred toward the component pressurizing unit 410, the upper and lower end plates 7, the separating plate component 4, and the MEA sheet component 5 within the stack guide 30 are pressurized through the press member 411 of the component pressurizing unit 410.

In this case, the press member 411 moves in the down direction by the press cylinder 413, and pressurizes the upper and lower end plates 7, the separating plate component 4, and the MEA sheet component 5 within the stack guide 30.

Then, in the exemplary embodiment of the present disclosure, the stack body 6 as the fuel cell stack 1, in which the upper and lower end plates 7, the separating plate component 4, and the MEA sheet component 5 are pressurized by the press member 411 and stacked, is fixed to the press member 411 through the pair of fixing rods 415, separately from the stack guide 30. The lower end of the fixing rod 415 may be coupled to the part supporting the lowermost part of the stack body 6 inside the stack guide 30 in a state where the upper end of the fixing rod 415 is fixed to the press member 411.

In this state, in the exemplary embodiment of the present disclosure, the press member 411 moves in the up direction through the press cylinder 413. Then, the stack body 6 is separated to the external side (upper side) of the stack guide 30.

Next, in the exemplary embodiment of the present disclosure, an accessory, such as the insulating plate 8 and the fastening bar 9, is mounted in the stack body 6, in such a manner that the accessory is mounted in the stack body 6 while the stack body 6 rotates 360° together with the press member 411 through the press motor 417.

In the meantime, in the exemplary embodiment of the present disclosure, air-tightness of the stack body 6 lifted by the press member 411 is examined through the air-tightness examining unit 430. The air-tightness examining unit 430 supplies hydrogen gas, air, and a cooling medium to the separating plate component 4 and the MEA sheet component 5 of the stack body 6, measures pressure of the hydrogen gas, the air, and the cooling medium of the separating plate component 4 and the MEA sheet component 5, and examines air-tightness of the stack body 6.

In the process, in the exemplary embodiment of the present disclosure, the stack guide 30 in the unloaded state, from which the stack body 6 is separated, is transferred toward the end plate loading unit 450 between the component stacking unit 350 and the component pressurizing unit 410 along the first transfer rail 511 through the first transfer stage 515.

The end plate gripper 451 of the end plate loading unit 450 grips the end plates 7 separately accommodated in the frame 10 one by one, and loads the lower end plate 7 onto the stack guide 30 in the unloaded state.

Then, in the exemplary embodiment of the present disclosure, the stack guide 30, onto which the lower end plate 7 is loaded, is transferred to the second transfer rail 513 of the evasion section of the first transfer rail 511.

Simultaneously, in the exemplary embodiment of the present disclosure, the second transfer stage 551 of the stack discharging unit 550 is transferred to a lower side of the stack body 6 through the first transfer rail 511. Then, in the exemplary embodiment of the present disclosure, the press member 411 lifting the stack body 6 moves in the down direction through the press cylinder 413, and loads the press member 411 onto the second transfer stage 551 of the stack discharging unit 550.

In the exemplary embodiment of the present disclosure, the lower end of the fixing rod 415 is separated from the part supporting the lowermost part of the stack body 6 in a state where the stack body 6 is laid on the second transfer stage 551 of the stack discharging unit 550 through the press member 411, and the press member 411 moves again in the up direction through the press cylinder 413.

In this case, the stack body 6 has been supported by the tilt bracket 561 of the tilting discharging unit 553 on the second transfer stage 551. That is, the tilt bracket 561 supports the lower side of the stack body 6 through the holding plate 563, and supports the lateral side of the stack body 6 through the support 565.

Then, in the exemplary embodiment of the present disclosure, the second transfer stage 551 is transferred to the finish end of the first transfer rail 511 from the press member 411 side of the component pressurizing unit 410.

Next, in the exemplary embodiment of the present disclosure, the operating rod 573 of the tilt operating cylinder 571 is driven forward, and the tilt bracket 561 is tilt-rotated toward the external side of the first transfer rail 511.

In this case, the operating rod 573 of the tilt operating cylinder 571 and the holding plate 563 of the tilt bracket 561 are hinge-coupled to each other through the connection rod 575, so that the tilt bracket 561 may be tilt-rotated to the external side of the first transfer rail 511 by the forward operation of the operating rod 573 in a state of supporting the stack body 6.

Then, the tilt bracket 561 supporting the stack body 6 is tilt-rotated toward the external side of the first transfer rail 511, so that in the exemplary embodiment of the present disclosure, the stack body 6 may be loaded onto a third trolley 803.

Accordingly, the apparatus 100 for automatically stacking a fuel cell stack according to the exemplary embodiment of the present disclosure may continuously assemble the fuel cell stack 1 through the series of aforementioned automation process.

As described above, the apparatus 100 for automatically stacking a fuel cell stack according to the exemplary embodiment of the present disclosure may automatically stack and pressurize the fuel cell components 3 and assemble the fuel cell stack 1.

Accordingly, in the exemplary embodiment of the present disclosure, it is possible to improve productivity by decreasing an operation time for assembling the fuel cell stack 1, guarantee a stack degree of the fuel cell components 3, and improve a quality of the fuel cell stack 1.

While this disclosure has been described in connection with what is presently considered to be practical exemplary embodiments, it is to be understood that the disclosure is not limited to the disclosed embodiments, but, on the contrary, is intended to cover various modifications and equivalent arrangements included within the spirit and scope of the appended claims.

What is claimed is:

1. An apparatus for automatically stacking a fuel cell stack, comprising:
   a component pick-up unit configured to simultaneously pick up one separating plate component accommodated in a first magazine and one membrane-electrode assembly (MEA) sheet component accommodated in a second magazine, and load the components onto a start end of a component transfer route of a conveyor;
   a component examining unit installed at an upper side of the component transfer route of the conveyor and configured to examine the separating plate component and the MEA sheet component transferred along the conveyor;
   a defective component extracting unit installed at a rear side of the component examining unit, and configured to grip each of the separating plate component and the MEA sheet component as a unit set determined to have a defect by the component examining unit, and load the gripped components onto a tray of an external side of the conveyor;
   a component stacking unit installed at a distal end of the component transfer route of the conveyor, and configured to grip the separating plate component and the MEA sheet component, and stack the components on a stack guide provided to be transferred in a direction crossing the component transfer route of the conveyor; and
   a component pressurizing unit installed at an upper side of a transfer route of the stack guide, and configured to pressurize the separating plate component and the MEA sheet component which are sequentially stacked on the stack guide.

2. The apparatus of claim 1, wherein the first magazine accommodates a plurality of sheets of the separating sheet component, in which negative electrode metal separating plates are bonded to positive electrode metal separating plates, and
   wherein the second magazine accommodates a plurality of sheets of the MEA sheet component, in which gas diffusion layers (GDL) are bonded to both surfaces of the MEA.

3. The apparatus of claim 1, further comprising a lift unit configured to support at least a pair of first and second magazines, and lift the components accommodated in the first and second magazines by driving a motor.

4. The apparatus of claim 1, wherein the component pick-up unit includes:
a pair of first and second gripper brackets installed so as to reciprocate along the component transfer route of the conveyor, and installed so as to reciprocate in a vertical direction;
a first component gripper installed at the first gripper bracket, and configured to vacuum-adsorb the separating plate component accommodated in the first magazine and load the vacuum-adsorbed separating plate component onto the start end of the component transfer route of the conveyor; and
a second component gripper installed at the second gripper bracket, and configured to vacuum-adsorb the MEA sheet component accommodated in the second magazine and load the vacuum-adsorbed MEA sheet component onto the start end of the component transfer route of the conveyor.

5. The apparatus of claim 4, wherein the component pick-up unit further includes a paper gripper installed at the first gripper bracket, and configured to vacuum-adsorb paper interposed between the separating plate components in the first magazine through a manifold hole of the separating plate components.

6. The apparatus of claim 5, wherein the component pick-up unit further includes a paper separating member installed at the first gripper bracket, and configured to separate a paper through the manifold hole of the separating plate component in a state where vacuum of the paper gripper is released.

7. The apparatus of claim 6, wherein a paper collecting container for collecting the paper separated from the separating plate component by the paper separating member is installed at the start end of the component transfer route of the conveyor.

8. The apparatus of claim 1, wherein the component examining unit includes a pair of location sensing visions configured to detect edge locations of manifold holes provided at both sides of the separating plate component and the MEA sheet component and output detection signals to a controller.

9. The apparatus of claim 1, wherein the defective component extracting unit includes a plurality of defective component extracting grippers installed so as to reciprocate in a direction crossing the component transfer route of the conveyor and installed so as to reciprocate in a vertical direction, and configured to vacuum-adsorb the separating plate component and the MEA sheet component.

10. The apparatus of claim 1, wherein the component stacking unit includes a pair of stack grippers disposed at an upper side of a start end of the transfer route of the stack guide, installed so as to reciprocate in a transfer direction of the separating plate component and the MEA sheet component and installed so as to reciprocate in a vertical direction, and configured to vacuum-adsorb the separating plate component and the MEA sheet component.

11. The apparatus of claim 1, wherein the component pressurizing unit includes a press member installed so as to reciprocate in a vertical direction by a press cylinder, and provided to be rotatable by a motor.

12. The apparatus of claim 11, wherein a pair of fixing rods for fixing a stack body, in which the separating plate component and the MEA sheet component are stacked, separately from the stack guide, is installed in the press member.

13. The apparatus of claim 1, further comprising an air-tightness examining unit installed to be connected to the component pressurizing unit, and configured to supply a fluid to a stack body, in which the separating plate component and the MEA sheet component are stacked by the component pressurizing unit, and examine air-tightness of the stack body.

14. The apparatus of claim 1, further comprising a stack examining unit installed at the component stacking unit side, and configured to examine the separating plate component and the MEA sheet component stacked on the stack guide; and
an end plate loading unit installed at an external side of the transfer route of the stack guide, and configured to grip each of upper and lower end plates and load the gripped end plates onto the stack guide.

15. An apparatus for automatically stacking a fuel cell stack, comprising:
a component pick-up unit configured to simultaneously pick up one separating plate component and one membrane-electrode assembly (MEA) sheet component accommodated in magazines, respectively, and load the components onto a start end of a component transfer route of a conveyor;
a component aligning unit installed to be connected to a distal end of the component transfer route of the conveyor, and configured to align the separating plate component and the MEA sheet component transferred through the conveyor at predetermined locations;
a component stacking unit installed at the component aligning unit, and configured to grip the separating plate component and the MEA sheet component and stack the components on a stack guide provided to be transferred in a direction crossing the component transfer route of the conveyor; and
a component pressurizing unit installed at an upper side of a transfer route of the stack guide, and configured to pressurize the separating plate component and the MEA sheet component which are sequentially stacked on the stack guide.

16. The apparatus of claim 15, wherein the component stacking unit includes:
a pair of stack grippers disposed at an upper side of a start end of the transfer route of the stack guide, installed so as to reciprocate in a transfer direction of the separating plate component and the MEA sheet component and installed so as to reciprocate in a vertical direction, and configured to vacuum-adsorb the separating plate component and the MEA sheet component.

17. The apparatus of claim 16, wherein the pair of stack grippers:
vacuum-adsorb any one component between the separating plate component and the MEA sheet component located at a finish end of the conveyor and load the vacuum-adsorbed component onto the component aligning unit, and
vacuum-adsorb the other component located in the component aligning unit and load the vacuum-adsorbed component onto the stack guide.

18. The apparatus of claim 15, wherein the component aligning unit includes a single base plate configured to support the separating plate component and the MEA sheet component, and touch members installed on the base plate, and configured to touch edge portions of the separating plate component and the MEA sheet component.

19. The apparatus of claim 18, wherein the base plate is provided with a plurality of air exhaust holes which discharges air and raises the separating plate component and the MEA sheet component with pressure of the air.

20. The apparatus of claim 18, wherein the touch members include:
- a pair of first touch members fixedly installed at a rear external side of the base plate, fitted to a rear edge portion of the base plate, and configured to touch rear edge portions of the separating plate component and the MEA sheet component;
- a pair of second touch members installed to be movable in front and rear directions at a front external side of the base plate, fitted to a front edge portion of the base plate, and configured to touch front edge portions of the separating plate component and the MEA sheet component; and
- a pair of third touch members installed to be movable in a side direction at both sides of the base plate, and configured to touch both side edge portions of the separating plate component and the MEA sheet component while passing through both sides of the base plate.

21. The apparatus of claim 20, wherein:
the second touch member is installed to reciprocate in the front and rear directions by a first touch cylinder fixedly provided to a lower surface of the base plate, and
the third touch member is installed to reciprocate in a side direction by a second touch cylinder fixedly provided to the lower surface of the base plate.

22. An apparatus for automatically stacking a fuel cell stack, comprising:
- a component pick-up unit configured to simultaneously pick up one separating plate component and one membrane-electrode assembly (MEA) sheet component accommodated in magazines, respectively, and load the components onto a start end of a component transfer route of a conveyor;
- a component stacking unit installed at a distal end of the component transfer route of the conveyor, and configured to grip the separating plate component and the MEA sheet component, and stack the components on a stack guide provided to be transferred in a direction crossing the component transfer route of the conveyor;
- a component pressurizing unit installed at an upper side of a transfer route of the stack guide, and configured to pressurize the separating plate component and the MEA sheet component which are sequentially stacked on the stack guide;
- an end plate loading unit installed at an external side of the transfer route of the stack guide between the component stacking unit and the component pressurizing unit, and configured to grip each of upper and lower end plates and load the gripped end plates onto the stack guide; and
- a transferring unit configured to transfer the stack guide, on which the separating plate component and the MEA sheet component are stacked by the component stacking unit from a start end of the transfer route of the stack guide to the component pressurizing unit side, and transfer a stack body, in which the separating plate component and the MEA sheet component are stacked by the component pressurizing unit, from the component pressurizing unit side to a finish end of the transfer route of the stack guide, separately from the stack guide.

23. The apparatus of claim 22, further comprising a stack discharging unit installed to be movable to the finish end of the transfer route of the stack guide from the component pressurizing unit side, and discharge the stack body to an external side of the transfer route of the stack guide.

24. The apparatus of claim 23, wherein the transferring unit includes:
- a first transfer rail configured to connect a start end and a finish end of the transfer route of the stack guide in a direction crossing a component transfer route of the conveyor;
- a second transfer rail connected with the first transfer rail while crossing the first transfer rail in a direction far from the end plate loading unit between the component stacking unit and the component pressurizing unit; and
- a pair of first transfer stages provided so as to correspond to the component stacking unit and the component pressurizing unit, respectively, and installed to be movable along the first and second transfer rails while supporting the stack guide between the component stacking unit and the component pressurizing unit.

25. The apparatus of claim 24, wherein:
the component pressurizing unit separates the stack body from the stack guide and loads the stack body onto the stack discharging unit, and
the end plate loading unit loads a lower end plate onto the stack guide in an unloaded state, from which the stack body is separated, on the first transfer rail between the component stacking unit and the component pressurizing unit, and loads an upper end plate onto the stack guide, on which the separating plate component and the MEA sheet component are stacked by the component stacking unit.

26. The apparatus of claim 25, wherein the second transfer rail is provided as an evasion section for evading the stack guide, onto which the lower end plate is loaded, from the first transfer rail through the first transfer stage.

27. The apparatus of claim 24, wherein the stack discharging unit includes:
- a second transfer stage installed to be movable between a start end and a finish end of the first transfer rail along a section from the component pressurizing unit side to the finish end of the first transfer rail; and
- a tilting discharging unit installed in the second transfer stage, and configured to tilt and discharge the stack body to an external side of the first transfer rail.

28. The apparatus of claim 27, wherein the tilting discharging unit includes:
- a tilt bracket configured to support the stack body, and installed to be rotatable in the second transfer stage; and
- a tilt operating cylinder installed to be connected to the tilt bracket, and operating forward and backward in a vertical direction.

* * * * *